(12) United States Patent
Holtzapple et al.

(10) Patent No.: US 12,179,145 B2
(45) Date of Patent: Dec. 31, 2024

(54) CRYOGENIC SEPARATION OF CARBON DIOXIDE, SULFUR OXIDES, AND NITROGEN OXIDES FROM FLUE GAS

(71) Applicant: The Texas A&M University System, College Station, TX (US)

(72) Inventors: Mark T. Holtzapple, College Station, TX (US); M. M. Faruque Hasan, College Station, TX (US); Mohammed Sadaf Monjur, College Station, TX (US)

(73) Assignee: The Texas A&M University System, College Station, TX (US)

( * ) Notice: Subject to any disclaimer, the term of this patent is extended or adjusted under 35 U.S.C. 154(b) by 435 days.

(21) Appl. No.: 17/558,903

(22) Filed: Dec. 22, 2021

(65) Prior Publication Data

US 2022/0203298 A1 Jun. 30, 2022

Related U.S. Application Data

(60) Provisional application No. 63/132,148, filed on Dec. 30, 2020.

(51) Int. Cl.
| | |
|---|---|
| *F25J 3/02* | (2006.01) |
| *B01D 53/02* | (2006.01) |
| *B01D 53/04* | (2006.01) |
| *B01D 53/14* | (2006.01) |
| *B01D 53/75* | (2006.01) |

(52) U.S. Cl.
CPC ............. *B01D 53/75* (2013.01); *B01D 53/02* (2013.01); *B01D 53/1431* (2013.01); *B01D 2252/205* (2013.01); *B01D 2253/106* (2013.01); *B01D 2257/302* (2013.01); *B01D 2257/404* (2013.01); *B01D 2257/504* (2013.01); *B01D 2258/0283* (2013.01)

(58) Field of Classification Search
CPC ........ B01D 53/02; B01D 53/04; B01D 53/75; B01D 53/1431; B01D 53/265; B01D 53/002; B01D 53/14; B01D 2252/205; B01D 2253/106; B01D 2257/302; B01D 2257/404; B01D 2257/504; B01D 2258/0283
USPC ................. 95/39, 117; 96/121; 62/600, 617
See application file for complete search history.

(56) References Cited

U.S. PATENT DOCUMENTS

| | | | |
|---|---|---|---|
| 9,958,200 B2 * | 5/2018 | Bauer | .............. F25J 3/067 |
| 2012/0137728 A1 * | 6/2012 | Zanganeh | ......... B01D 53/002 62/617 |
| 2014/0116358 A1 * | 5/2014 | Stallmann | ............ F01N 3/2066 122/23 |

(Continued)

FOREIGN PATENT DOCUMENTS

JP 2007-93085 A 4/2007

OTHER PUBLICATIONS

Monjur, M. S. et al.; "(368a) Cryogenic Separation of $CO_2$, $SO_2$, and $NO_x$ from Flue Gas"; AIChE Annual Meeting; Nov. 9, 2021; 6 pages.

*Primary Examiner* — Frank M Lawrence, Jr.
(74) *Attorney, Agent, or Firm* — Winstead PC

(57) ABSTRACT

A method of removing pollutants from flue gas includes cooling the flue gas to remove condensed water. The flue gas is then compressed and dehydrated. The dehydrated flue gas is chilled to separate pollutants.

20 Claims, 31 Drawing Sheets

(56) References Cited

U.S. PATENT DOCUMENTS

2014/0123700 A1    5/2014  Stallmann
2014/0345880 A1   11/2014  Enis et al.
2015/0376801 A1*  12/2015  Bairamijamal ........... C25B 9/05
                                                                          518/704

* cited by examiner

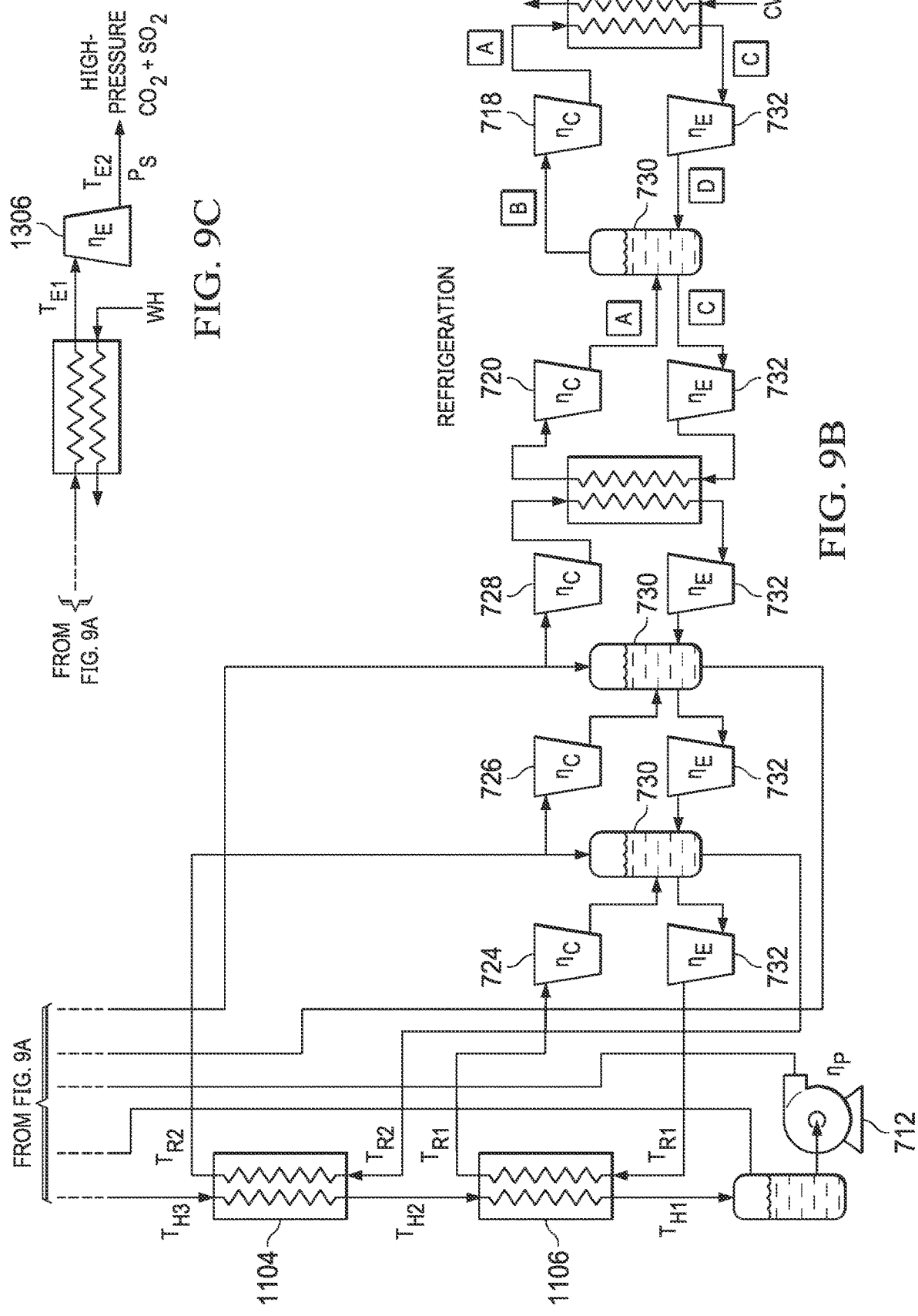

CRYOGENIC SEPARATION OF CARBON DIOXIDE, SULFUR OXIDES, AND NITROGEN OXIDES FROM FLUE GAS

CROSS-REFERENCE TO RELATED APPLCIATIONS

This patent application claims priority to, and incorporates by reference the entire disclosure of, U.S. Provisional Patent Application No. 63/132,148, filed on Dec. 30, 2020.

TECHNICAL FIELD

The present disclosure relates generally to removal of pollutants from flue gas and more particularly, but not by way of limitation, to utilizing cryogenics to separate carbon dioxide, sulfur oxides, and nitrogen oxides from flue gas.

BACKGROUND

This section provides background information to facilitate a better understanding of the various aspects of the disclosure. It should be understood that the statements in this section of this document are to be read in this light, and not as admissions of prior art.

The combustion of fossil fuels, such as coal, oil, and natural gas, releases carbon dioxide into the environment, which results in global warming. In the future, to curb climate change, the removal of carbon dioxide from flue gas and stationary/point sources is likely to become required.

Additionally, many fossil fuels contain sulfur. When combusted, the sulfur becomes sulfur oxides $SO_x$ where x varies and is used to represent the following chemical species: $SO_2$ and $SO_3$. Generally, $SO_2$ is the dominant sulfur oxide present in flue gas. In the atmosphere, sulfur dioxide reacts with water to become sulfurous acid, which results in acid rain. Most coal-fired power plants employ scrubbers that typically remove about 95% of sulfur dioxide.

Furthermore, high combustion temperatures cause atmospheric nitrogen and nitrogen within the fuel to become nitrogen oxides (NOx) where x varies and is used to represent the following chemical species: $N_2O$, $NO$, $N_2O_2$, $N_2O_3$, $NO_2$, $N_2O_4$, and $N_2O_5$. Generally, $NO_2$ is the dominant nitrogen oxide present in flue gas. Modern industrial combustors include means for reducing emissions of nitrogen oxides into the atmosphere.

SUMMARY

A method of removing pollutants from flue gas. The method includes cooling and compressing the flue gas to remove condensed water. The flue gas is then dehydrated. The dehydrated flue gas is chilled to separate pollutants.

A system for removing pollutants from a flue gas stream. The system includes a flue gas feed. A first heat exchanger is coupled to the flue gas feed. The first heat exchanger thermally exposes the flue gas feed to cold water to form a cooled flue gas. A dryer is coupled to the cooled flue gas. The dryer forms a dehydrated flue gas. A second heat exchanger is coupled to the dehydrated flue gas. The second heat exchanger thermally exposes the dehydrated flue gas to a chilled refrigerant to form a liquid. A pump is coupled to the second heat exchanger. The pump increases the pressure of the liquid. A third heat exchanger thermally exposes the pressurized liquid to the dehydrated flue gas. The third heat exchanger forms pressurized waste gases.

This summary is provided to introduce a selection of concepts that are further described below in the Detailed Description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the subject matter of the present disclosure may be obtained by reference to the following Detailed Description when taken in conjunction with the accompanying Drawings wherein:

FIGS. 9A-9C are a schematic diagram of an alternative process that separates $CO_2$ and $SO_2$ from flue gas wherein the liquid is pressurized to a higher pressure according to aspects of the disclosure;

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Figure 1:
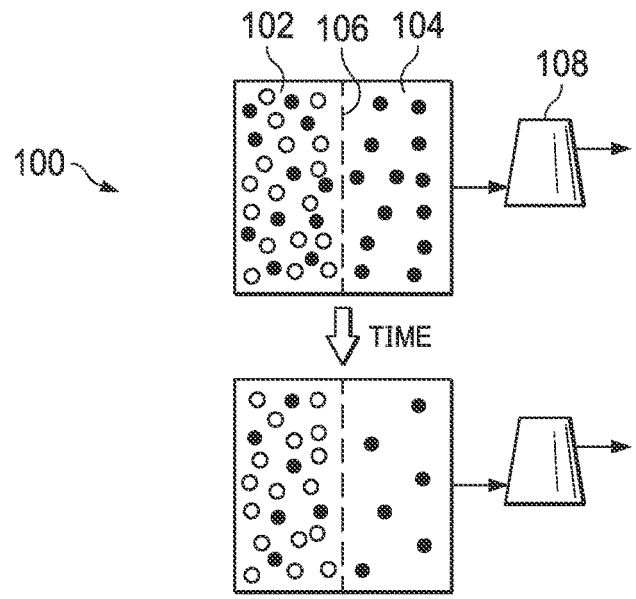
FIG. 1 shows a schematic representation of a batch of gas being separated from a mixture and then compressed according to aspects of the disclosure.

FIG. 1 shows a schematic representation of a vessel 100 that separates and pressurizes carbon dioxide isolated from a gas mixture. The vessel 100 is separated into a first chamber 102 and a second chamber 104 by a $CO_2$-selective membrane 106 that allows carbon dioxide to diffuse with zero resistance while blocking the diffusion of all other flue gas components (e.g., nitrogen, oxygen, argon, etc.). The first chamber 102 contains the gas mixture of flue gas and the second chamber 104 contains carbon dioxide. Initially, the first chamber 102 is charged with a batch of flue gas at its original composition. As time progresses, carbon dioxide diffuses through the membrane 106. In various embodiments, the membrane 106 has resistance idealized to be zero, thus the fugacities of carbon dioxide on each side of the membrane 106 are approximately identical. Should the gas mixture be considered an ideal gas, the partial pressures of carbon dioxide on each side of the membrane 106 are approximately identical. The carbon dioxide that diffuses through the membrane 106 is compressed to a final pressure. In various embodiments, the minimum compression energy is from, for example, a reversible (frictionless) isothermal compressor 108. As time progresses, the inlet pressure to the compressor 108 decreases, which causes the work to increase while reaching a constant outlet pressure.

The theoretical work required to isothermally compress the gas is determined from the difference in Gibbs free energy between the compressor inlet and outlet shown in Equation 1:

$$W = G_o - G_i \qquad \text{Equation 1:}$$

where W is the theoretical work (kJ/mol), $G_o$ is the Gibbs free energy of the compressor outlet (kJ/mol), and $G_i$ is the Gibbs free energy of the compressor outlet (kJ/mol).

The Gibbs free energy is determined from the following definition shown in Equation 2:

$$G = H - TS \qquad \text{Equation 2:}$$

where H is enthalpy (kJ/mol), T is absolute temperature (K), and S is entropy (kJ/(mol·K)). Thus, the work increases as the pressure decreases, which corresponds to a greater percentage of carbon dioxide recovery, defined as in Equation 3:

$$\text{Recovery} \equiv \frac{n}{n_0} \times 100\% \qquad \text{Equation 3}$$

where n is the moles of carbon dioxide that flow through the compressor (mol) and $n_0$ is the initial moles of carbon dioxide (mol) in the vessel 100 shown in FIG. 1.

Figure 2A:
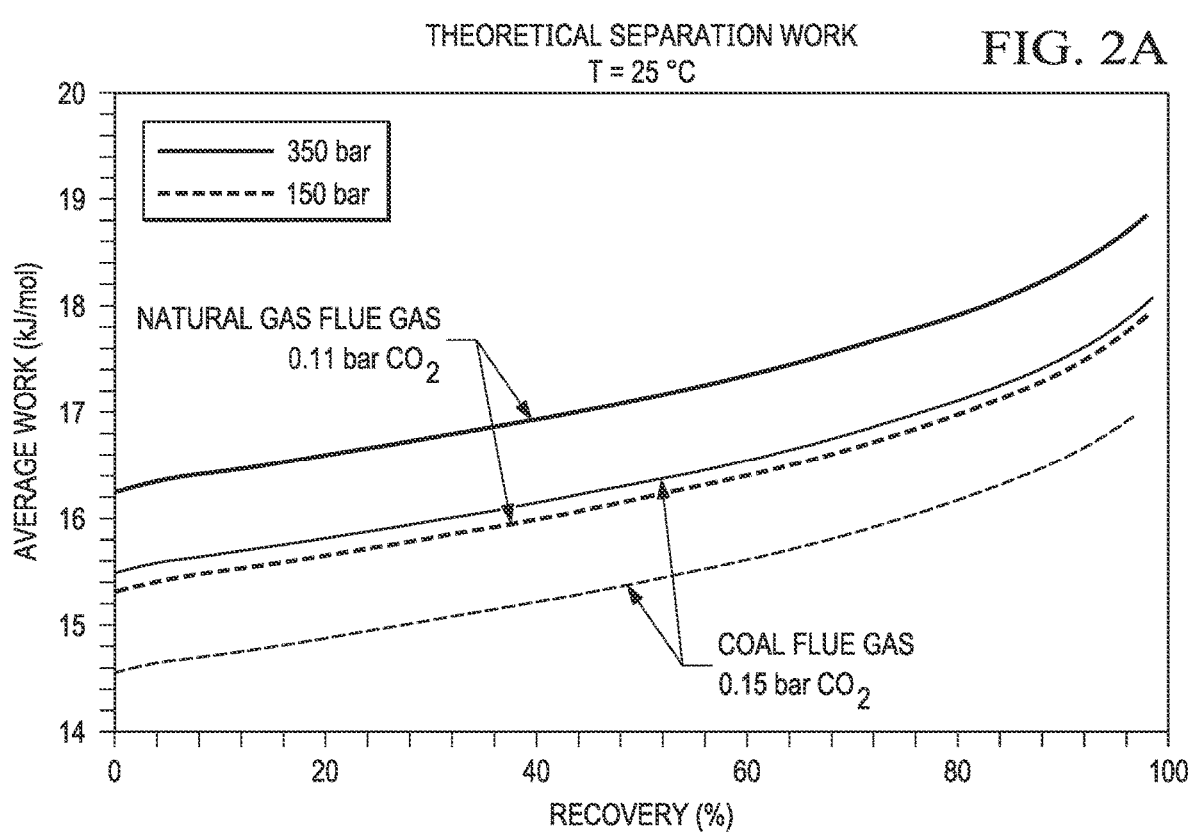
FIG. 2A shows the average theoretical work to separate carbon dioxide from coal and natural gas combustion flue gas and compress it to 150 and 350 bar according to aspects of the disclosure.

During the time period from the initial partial pressure of $CO_2$ to the final partial pressure corresponding to a given percentage recovery, FIG. 2 shows the average theoretical work required to compress the carbon dioxide shown in FIG. 1. The average theoretical work $W_{ave}$ (kJ/mol) is determined from Equation 4:

$$W_{ave} = \frac{\int_0^n (G_o - G_i) dn}{n} \qquad \text{Equation 4}$$

where n is the moles that flowed through the compressor during the time period (mol). The integration in the numerator is obtained from the instantaneous theoretical work required to compress the carbon dioxide shown in FIG. 1. FIG. 2A shows the required average work for two flue gases resulting from near stoichiometric combustion of fuels: coal (15 mol % $CO_2$, dry basis) and natural gas (11 mol % $CO_2$, dry basis). Additionally, FIG. 2A shows two final pressures: 150 and 350 bar.

Flue gas contains many components including, for example, nitrogen, oxygen, argon, water vapor, carbon dioxide, sulfur oxides, nitrogen oxides, and other trace gases. In various embodiments, the water vapor is readily condensed, so it can be removed from consideration. Oxygen, argon, and trace gases are small relative to nitrogen; thus, for simplicity, nitrogen may be considered the dominant component of the flue gas stream. The nitrogen oxide content depends on the nitrogen content of the fuel and the combustion temperature. In many cases, particularly when combustion temperatures are low, nitrogen oxide content is small. Thus, for simplicity, the gas stream is assumed to contain only nitrogen, carbon dioxide, and sulfur dioxide.

In various embodiments, small amounts of sulfur dioxide in the vapor dramatically lower the dew point pressure. Sulfur dioxide ($T_{triple}$=197.64 K=−75.51° C., $P_{triple}$=0.0167 bar) is less volatile than carbon dioxide ($T_{triple}$=216.55 K=−56.6° C., $P_{triple}$=5.17 bar), so it preferentially dissolves in the liquid phase, thus creating a "solvent" that helps dissolve carbon dioxide.

Similarly, small amounts of nitrogen oxides such as nitrogen dioxide in the vapor lower the dew point pressure. Nitrogen dioxide ($T_{triple}$=261.9 K=−11.25° C., $P_{triple}$=0.18728 bar) is less volatile than carbon dioxide ($T_{triple}$=216.55 K=−56.6° C., $P_{triple}$=5.17 bar), so it preferentially dissolves in the liquid phase, thus creating a "solvent" that helps dissolve carbon dioxide.

Furthermore, combinations of sulfur dioxide and nitrogen oxides create a "solvent" that helps dissolve carbon dioxide.

Figure 2B:
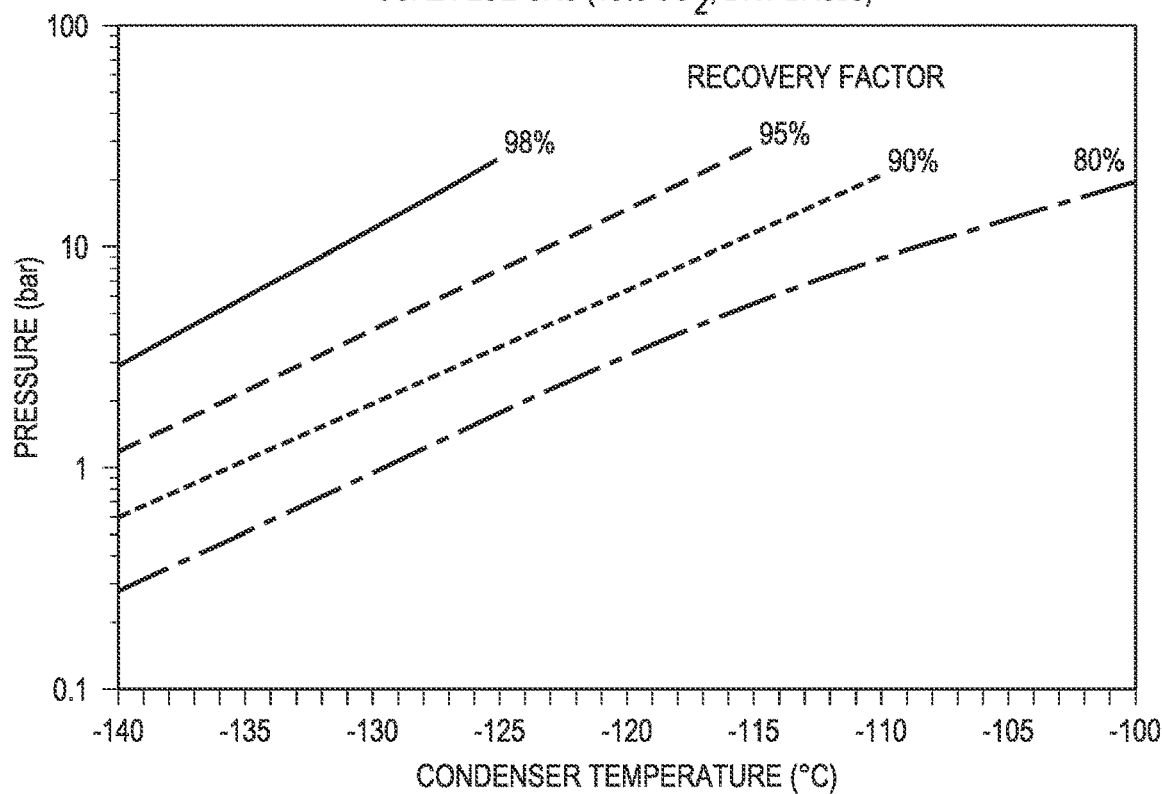
FIG. 2B shows the combinations of temperature and pressure required to recover various percentages of carbon dioxide from a mixture of oxygen and carbon dioxide assuming the gas feed is from coal combustion flue gas (15 mol % $CO_2$, dry basis) according to aspects of the disclosure.
Figure 2C:
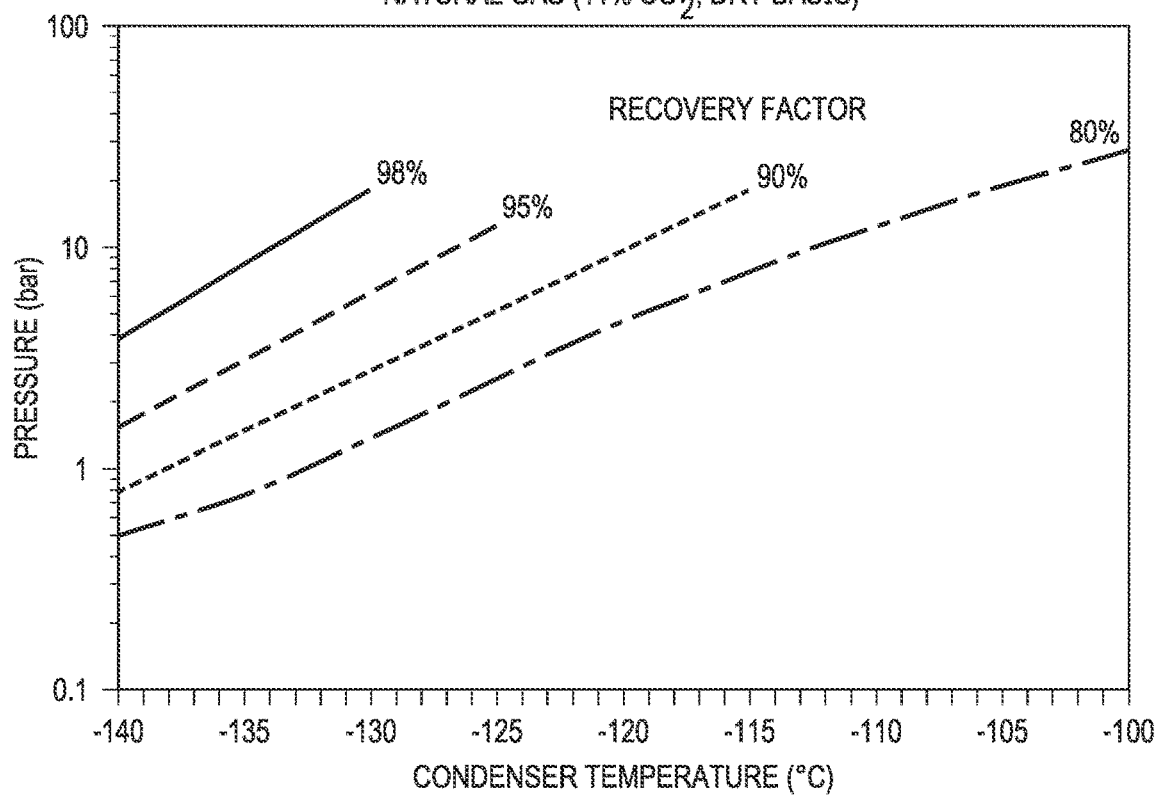
FIG. 2C shows the combinations of temperature and pressure required to recover various percentages of carbon dioxide from a mixture of oxygen and carbon dioxide assuming the gas feed is from natural gas combustion flue gas (11 mol % $CO_2$, dry basis) according to aspects of the disclosure.

Because the concentrations of sulfur dioxide and nitrogen oxides are highly variable and often small, for simplicity, their concentrations are assumed to be zero; thus, in the following discussion related to FIGS. 2B and 2C, the dehydrated flue gas is assumed to contain predominantly nitrogen and carbon dioxide.

The recovery factor is defined in Equation 5:

$$\text{Recovery Factor} \equiv \left(1 - \frac{y_v}{y_f}\right) \times 100\% \qquad \text{Equation 5}$$

where $y_v$ is the mole fraction of $CO_2$ in the vapor phase above the condensed liquid and $y_f$ is the mole fraction of $CO_2$ in the raw flue gas. The recovery factor and recovery have similar values. Increasing $CO_2$ recovery requires increasing pressures and decreasing temperatures as shown in FIGS. 2B and 2C.

As described previously, $CO_2$ recovery improves with higher concentrations of sulfur dioxide. For this reason, if desired, high-sulfur coal, oil, or natural gas can be burned, thus resulting in greater concentrations of $SO_2$ that aid $CO_2$ separation. Furthermore, it is possible to purposely burn sulfur and introduce the resulting $SO_2$ into the flue gas. Because sulfur is typically removed from natural gas via the Claus process, there are large quantities of sulfur available globally that can be used for this purpose. The recovery of $SO_2$ via cryogenic methods is extremely high and is much greater than traditional $SO_2$ scrubbers. For this reason, traditional scrubbers can be eliminated and thereby save associated capital expenditures and operational expenditures.

Similarly, high-temperature combustion produces nitrogen oxides from nitrogen in the fuel, and also from nitrogen in the air. To reduce nitrogen oxide emissions, combustion temperatures are often reduced, which limits flexibility in the operation of combustors. Because nitrogen oxides can be removed from the flue gas using the processes described herein, in various embodiments combustors can operate at higher temperatures and with high-nitrogen fuels, if desired.

It is understood that flue gas is complex and contains many substances such as nitrogen, oxygen, water, carbon dioxide, sulfur oxides, nitrogen oxides, argon, and other trace gases present in air. For simplicity, throughout the remaining description, flue gas will be represented as gas (primarily nitrogen), water vapor, carbon dioxide, and sulfur dioxide. It is understood that other gases are present, but will not be described for the sake of simplicity and brevity.

Figure 3:
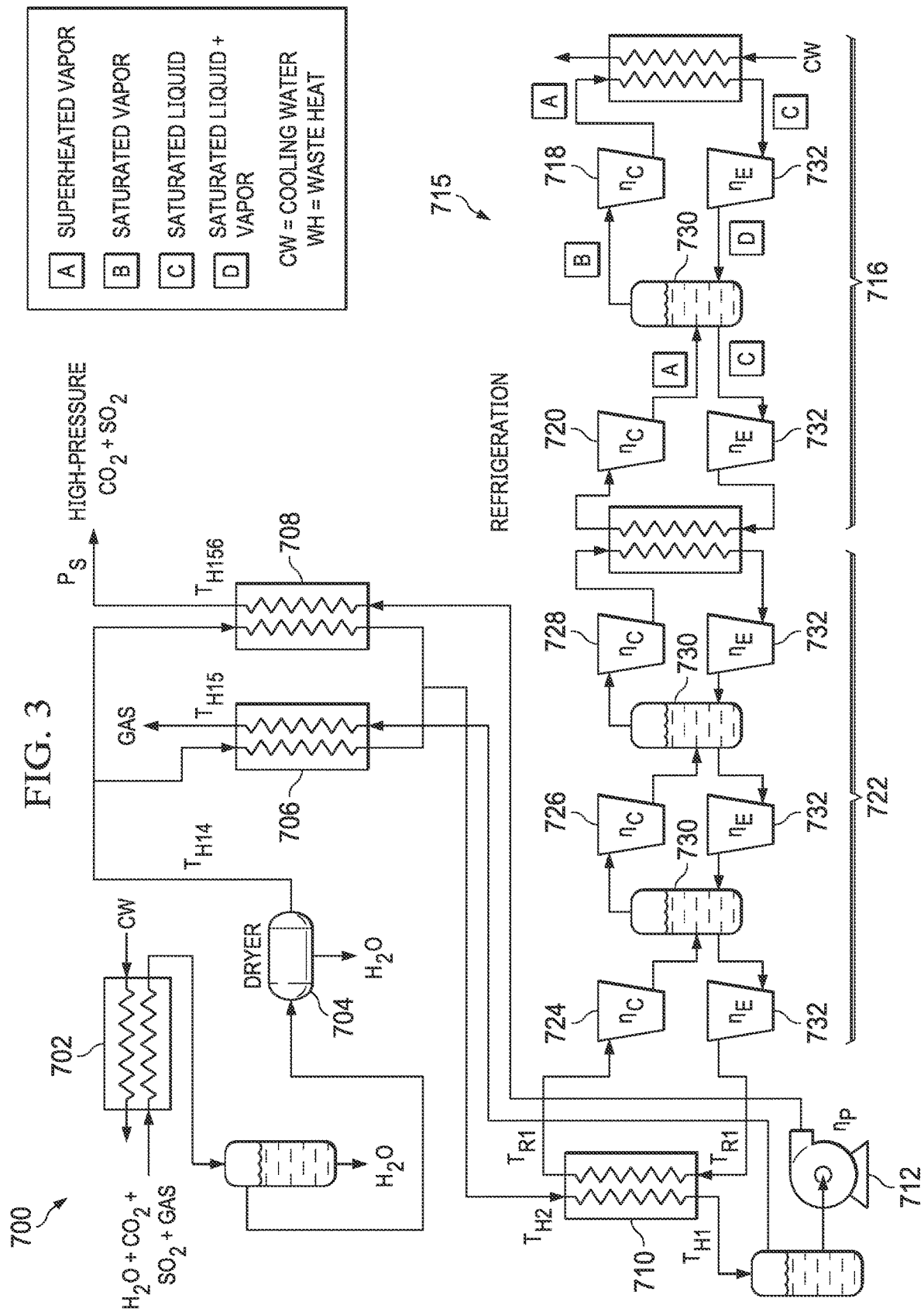
FIG. 3 is a schematic diagram of a process for separating $CO_2$ and $SO_2$ from flue gas according to aspects of the disclosure.

FIG. 3 is a schematic diagram of a process 700 that separates $CO_2$ and $SO_2$ from flue gas. First, the flue gas is cooled against cooling water in a first heat exchanger 702, which condenses liquid water. In various embodiments, the first heat exchanger 702 is a countercurrent-flow heat exchanger; however, in other embodiments, a cocurrent-flow heat exchanger or other type of heat exchanger could be utilized. From the first heat exchanger 702, the cooled flue gas then enters a drier 704 where further dehydration of the flue gas occurs. In various embodiments, the further dehydration could be accomplished using a solid desiccant such as, for example, a zeolite molecular sieve, silica gel, calcium sulfate, calcium chloride, or activated carbon or a liquid desiccant such as, for example, a lithium bromide salt solution or ethylene glycol. In various embodiments, when the desiccant becomes saturated with water, the desiccant is taken off-line and regenerated by heating; thus, the desiccant is recycled. In various embodiments, the source of heat for regeneration may be, for example, waste heat, which is commonly available where flue gases are generated. Alternatively, rather than using a desiccant, the water can be removed via refrigeration. In various embodiments, a combination of desiccant and refrigeration can be employed.

Then, the dehumidified flue gas is split into two streams and cooled countercurrently in a second heat exchanger 706 against outgoing gas and in a third heat exchanger 708 against outgoing $CO_2$ and $SO_2$. The precooled flue gas then contacts a condenser 710 that liquefies a portion of the flue gas, predominantly $CO_2$ and $SO_2$, but, in various embodiments, also small amounts of residual gas components such as, for example, nitrogen oxides. Using a pump 712, the liquid is pressurized to a storage pressure $P_S$, which typically ranges from approximately 150 to approximately 350 bar.

In various embodiments, refrigeration is performed using a multi-stage refrigeration system 715. As an illustrative example, FIG. 3 shows two refrigerants; the higher-temperature refrigerant 716 has two compression stages 718, 720 and the lower-temperature refrigerant 722 has three compression stages 724, 726, 728. This design has great flexibility regarding the kind of refrigerants and the number of stages, as will be described in later examples.

To improve energy efficiency, between each compression stage, the superheated vapors exiting each compressor are contacted with liquid refrigerant, which saturates the vapor entering the compression stages 724, 726, 728. In FIG. 3, the contact between superheated vapor and liquid is a tank 730 where the superheated vapor enters the bottom of the liquid. As bubbles rise through the liquid, superheat is removed and saturated bubbles exit the top. In various embodiments, other contactors can be deployed, such as, for example, structured packing or dumped packing.

In various embodiments, to improve efficiency, as liquid refrigerant flows from a higher pressure to a lower pressure, expanders 732 are used to recover work and thereby minimize the amount of vapor produced during the pressure let-down. Alternatively, the expanders 732 can be replaced with throttling valves, which provides simplification, however introduce an irreversibility that lowers energy efficiency.

In various embodiments, many types of compressors and expanders can be employed, such as dynamic machines (e.g., centrifugal, axial) and positive-displacement machines (e.g., reciprocating, screw). In various embodiments, gerotor machines are employed. In the example illustrated in FIG. 3, the condensation of the $CO_2$ and $SO_2$ occurs at a pressure of approximately 1 bar.

Figure 4:
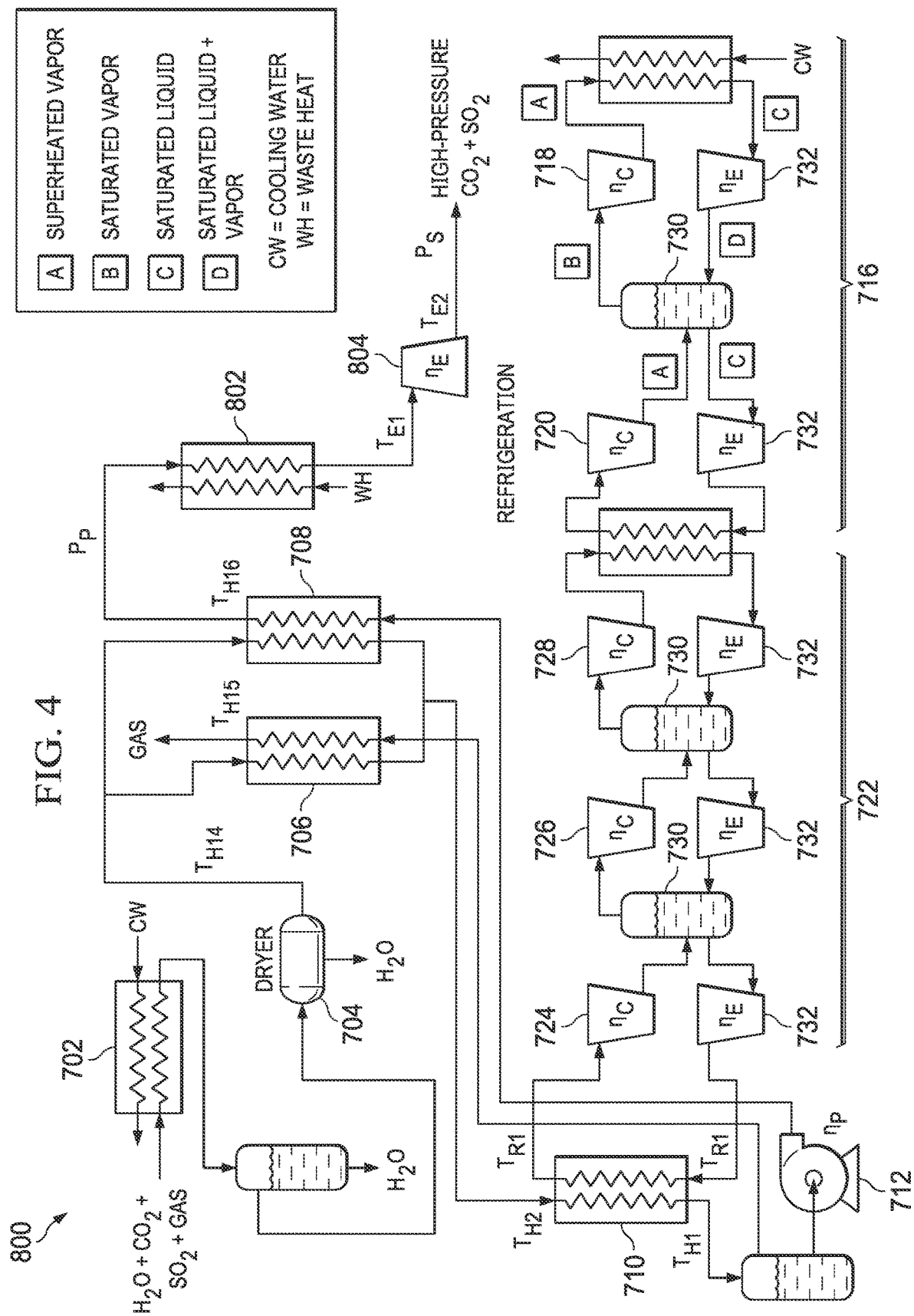
FIG. 4 is a schematic diagram of an alternative process for separating $CO_2$ and $SO_2$ from flue gas wherein the pump pressurizes the liquid $CO_2$ and $SO_2$ above the storage pressure $P_S$ according to aspects of the disclosure.

FIG. 4 is a schematic diagram of a process 800 that separates $CO_2$ and $SO_2$ from flue gas wherein the pump 712 pressurizes the liquid $CO_2$ and $SO_2$ above the storage pressure $P_S$. After the high-pressure liquid exits the third heat exchanger 708, it is heated further in a fourth heat exchanger 802 to raise its temperature. The hot high-pressure liquid then flows through an expander 804 where it produces work that helps operate the process 800. In various embodiments, the source of heat can be from a variety of sources such as, for example, solar collectors or waste heat available from the process that produces the flue gas. In chemical plants, it is common that waste heat is available at about 90° C., although temperatures above and below this value are common as well.

Figure 5:
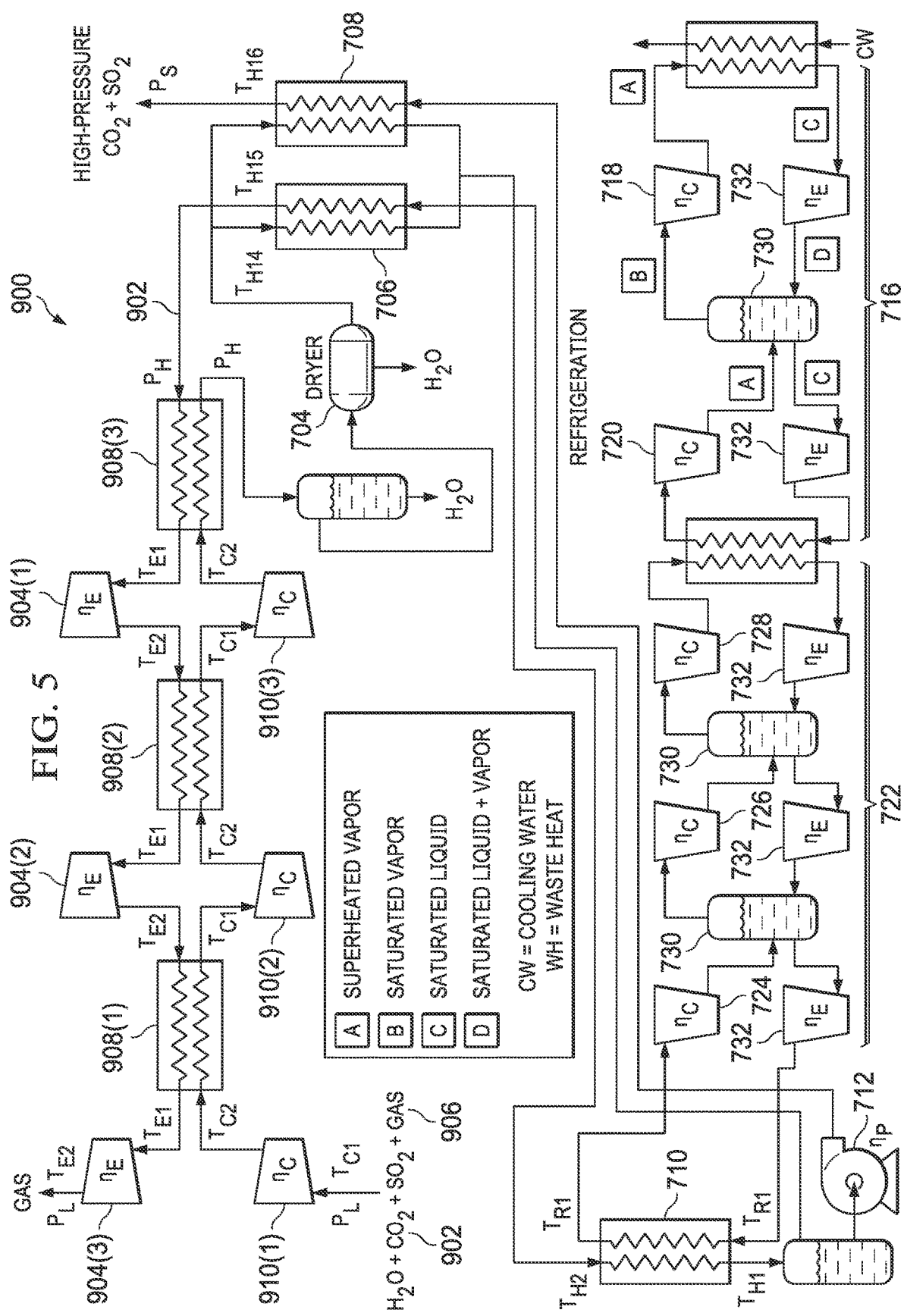
FIG. 5 is a schematic diagram of an alternative process that separates $CO_2$ and $SO_2$ from flue gas wherein the condenser operates at an elevated pressure according to aspects of the disclosure.

FIG. 5 is a schematic diagram of a process 900 that separates $CO_2$ and $SO_2$ from flue gas wherein the condenser 710 operates at an elevated pressure. In various embodiments, operating at higher pressures allows the condenser temperature to increase for a given recovery factor, which reduces the required refrigeration work. In the embodiment shown in FIG. 5, the exhaust gas 902 flows through a series of expanders 904(1)-(3), which recover work from the exhaust gas 902 and thereby improves energy efficiency. The expansion process cools the exhaust gas 902 and the compression process heats the flue gas 906; therefore, to improve efficiency, the exhaust gas 902 and the flue gas 906 exchange heat in countercurrent heat exchangers 908(1)-(3). In FIG. 5, three compression stages 910(1)-(3) and three expansion stages 904(1)-(3) are shown by way of example; however, fewer or more can be employed, as desired.

Figure 6A:
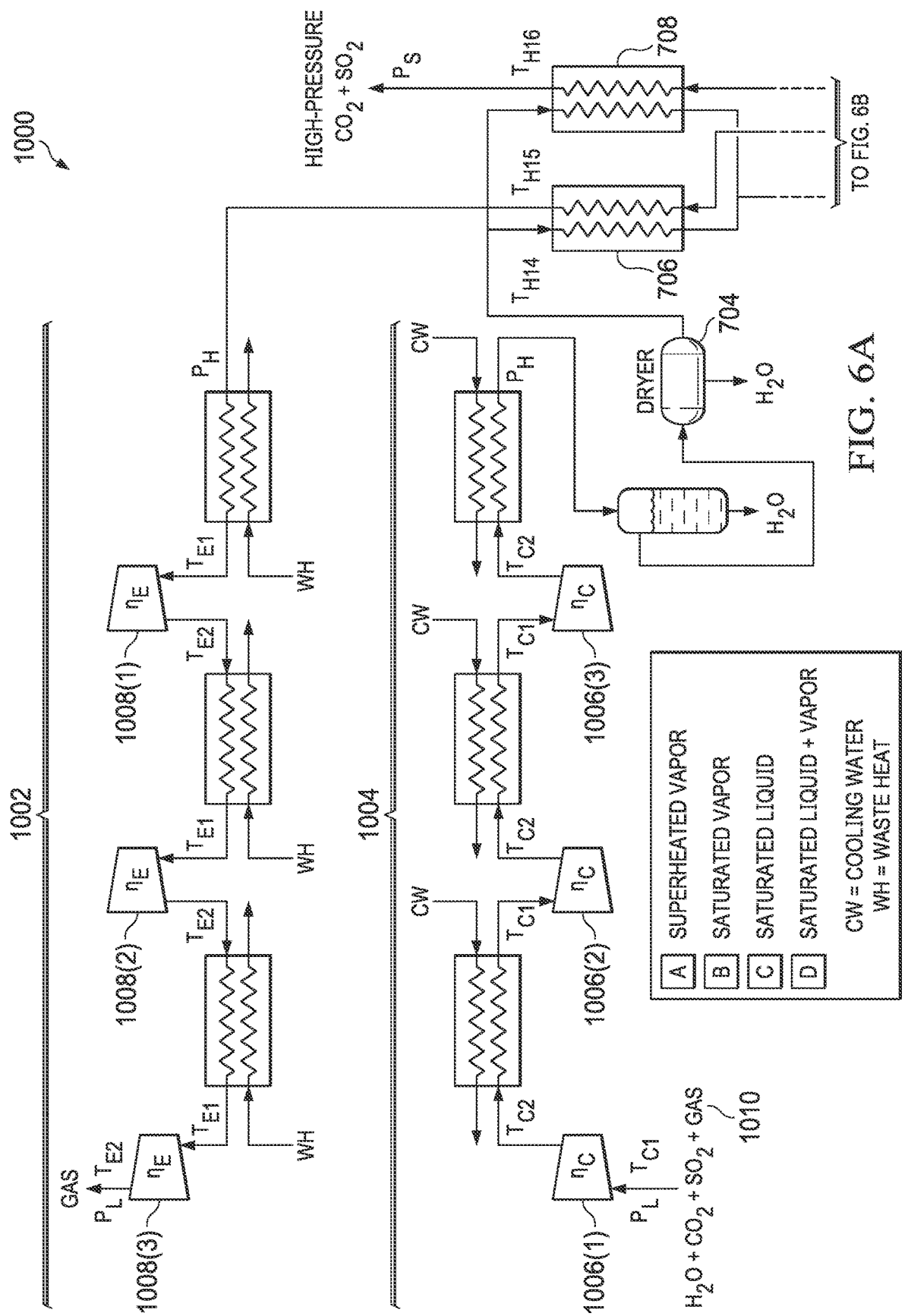
FIGS. 6A-6B are a schematic diagram of an alternative process that separates $CO_2$ and $SO_2$ from flue gas wherein the expansion train operates at a higher temperature than the compression train according to aspects of the disclosure.
Figure 6B:
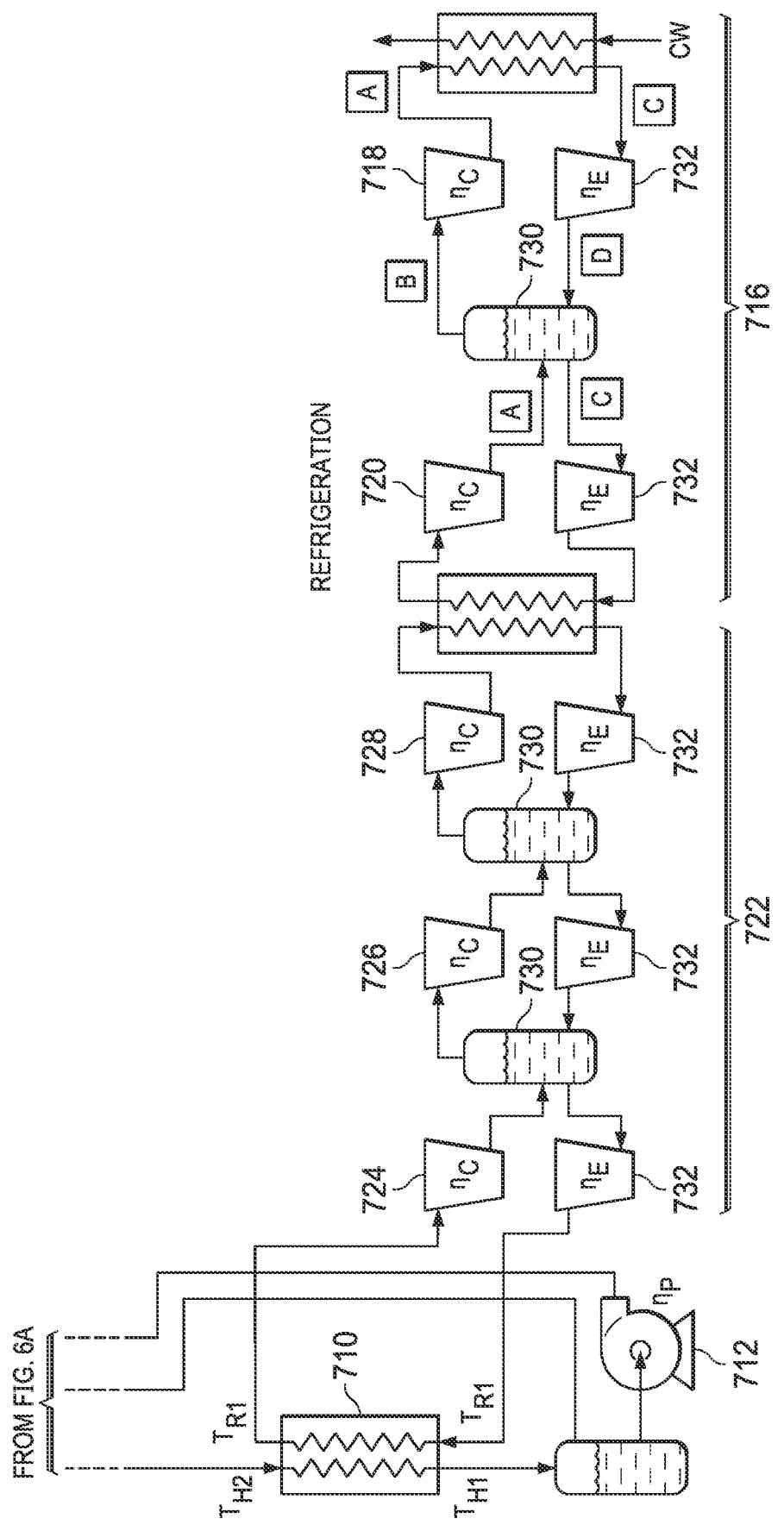

FIGS. 6A-6B are a schematic diagram of a process 1000 that separates $CO_2$ and $SO_2$ from flue gas 1010 wherein expansion train 1002 operates at a higher temperature than compression train 1004. In various embodiments, compressors 1006(1)-(3) and expanders 1008(1)-(3) operate as a heat engine that produces work and thereby improves energy efficiency of the process 1000. In various embodiments, the expanders 1008(1)-(3) may be heated from a variety of sources, such as, for example, solar energy or waste heat from the associated process that produces the flue gas 1010.

Figure 7A:
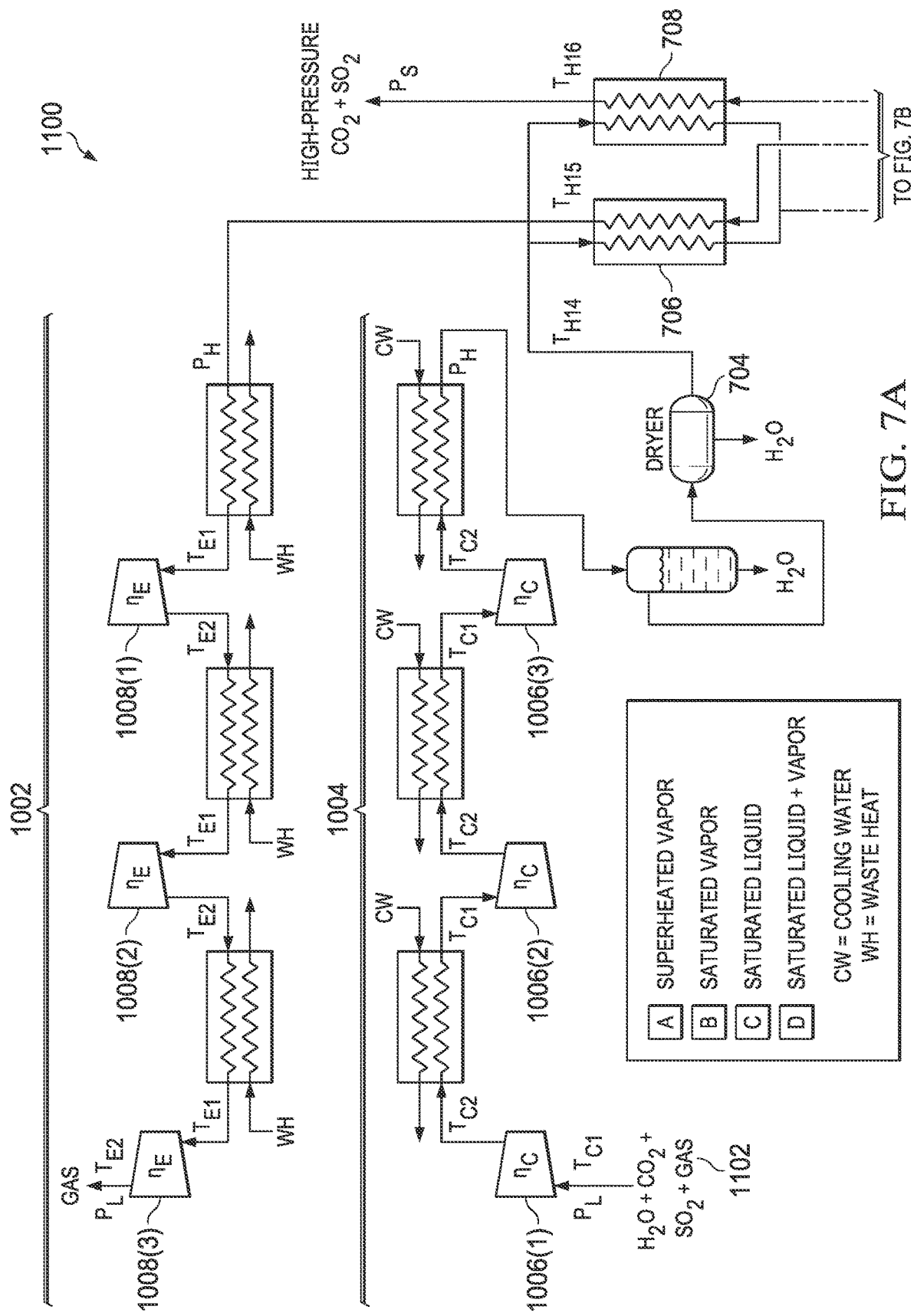
FIGS. 7A-7B are a schematic diagram of an alternative process that separates $CO_2$ and $SO_2$ from flue gas wherein the condenser is split into two sections according to aspects of the disclosure.
Figure 7B:
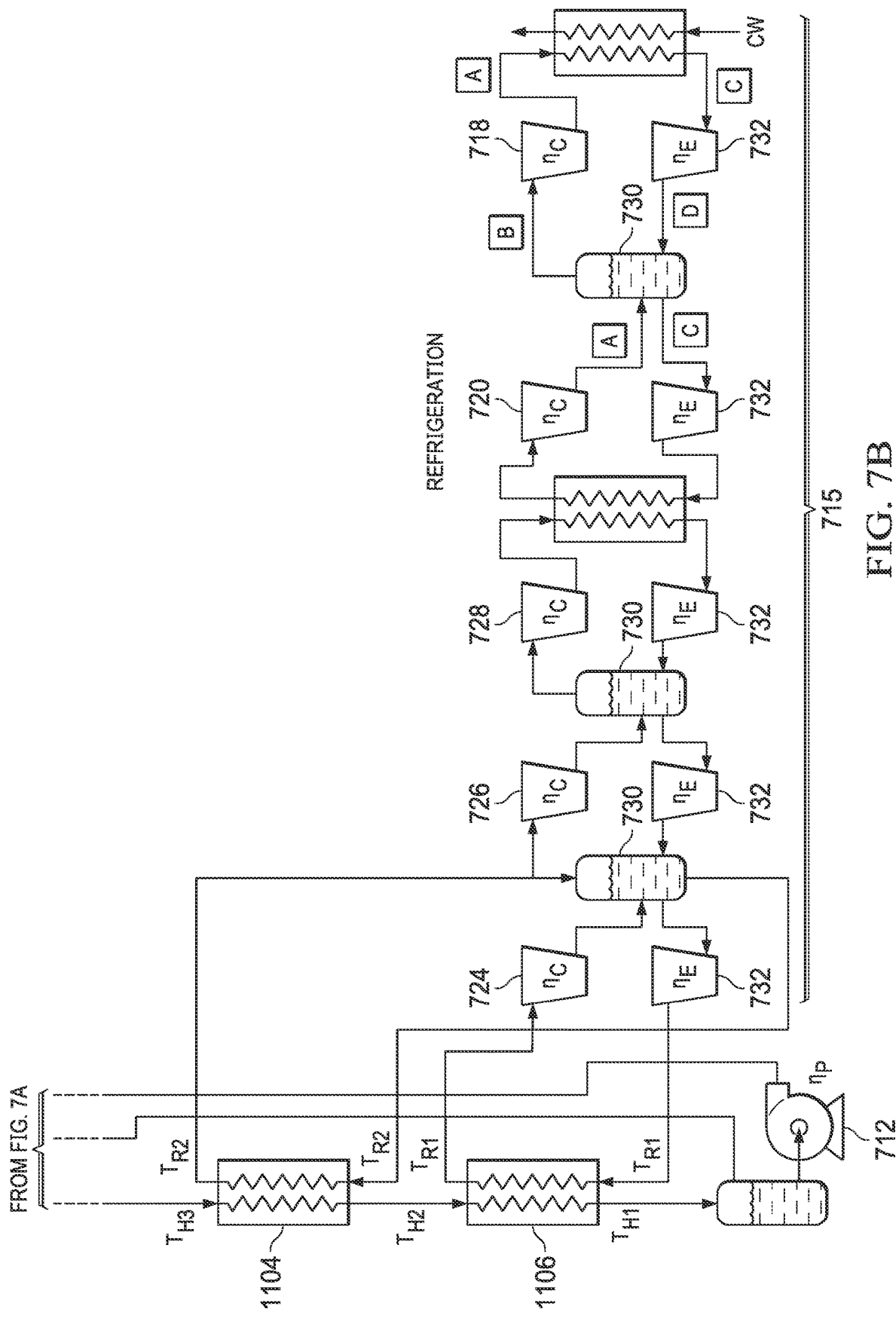

FIGS. 7A-7B are a schematic diagram of a process 1100 that separates $CO_2$ and $SO_2$ from flue gas 1102 wherein the condenser 710 is split into a first section 1104 and a second section 1106. Because the condensation is not a single pure fluid, the condensation does not occur at a single temperature; rather, it occurs over a range of temperatures. In the embodiment shown in FIG. 7, the first section 1104 operates at a higher temperature by using liquid from an intermediate stage in the refrigeration section 715. Because heat is removed at a higher temperature, the use of the first section 1104 and the second section 1106 improves energy efficiency.

Figure 8A:
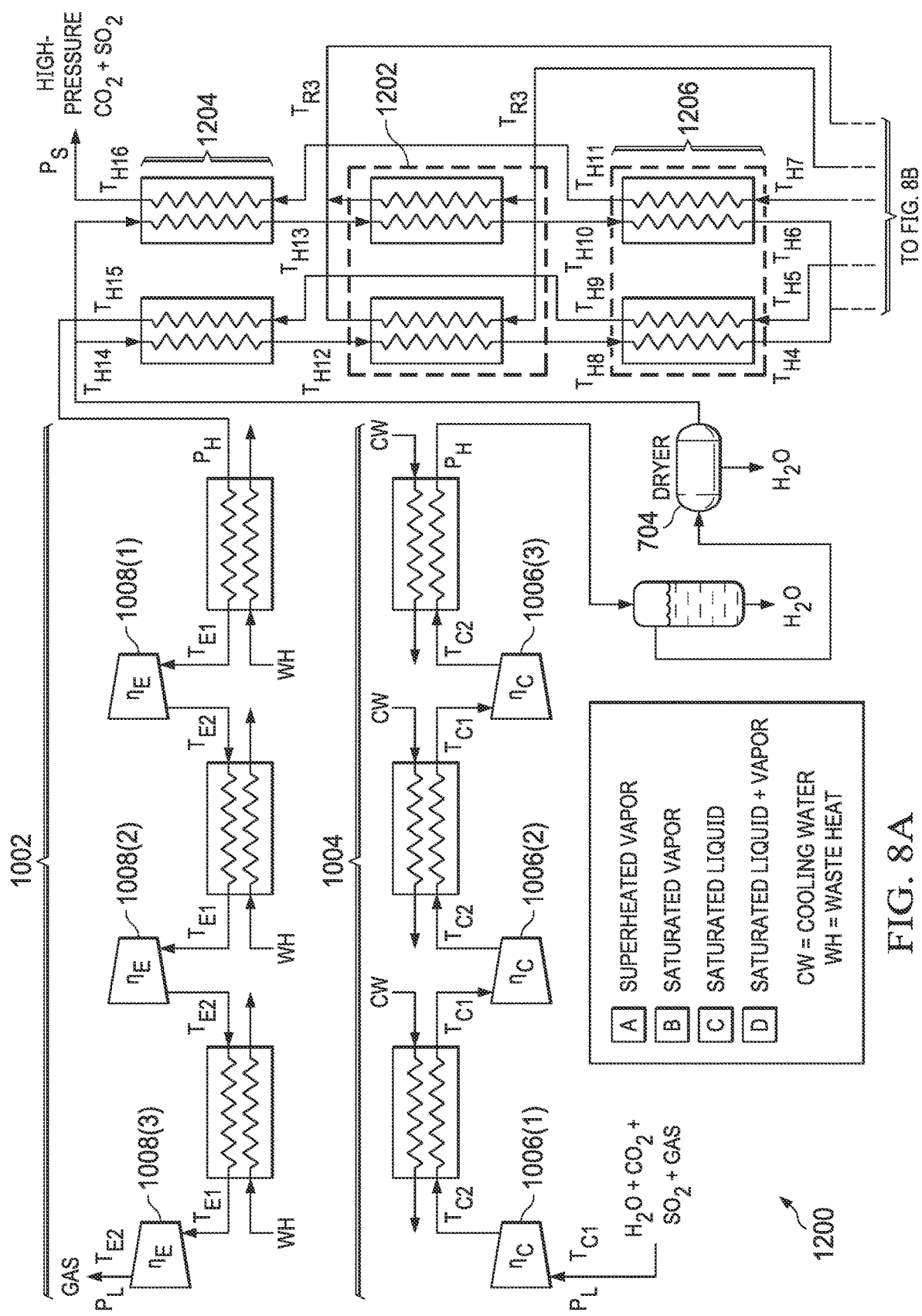
FIGS. 8A-8B are a schematic diagram of an alternative process that separates $CO_2$ and $SO_2$ from flue gas wherein a third condenser is utilized that operates at a higher temperature according to aspects of the disclosure.
Figure 8B:
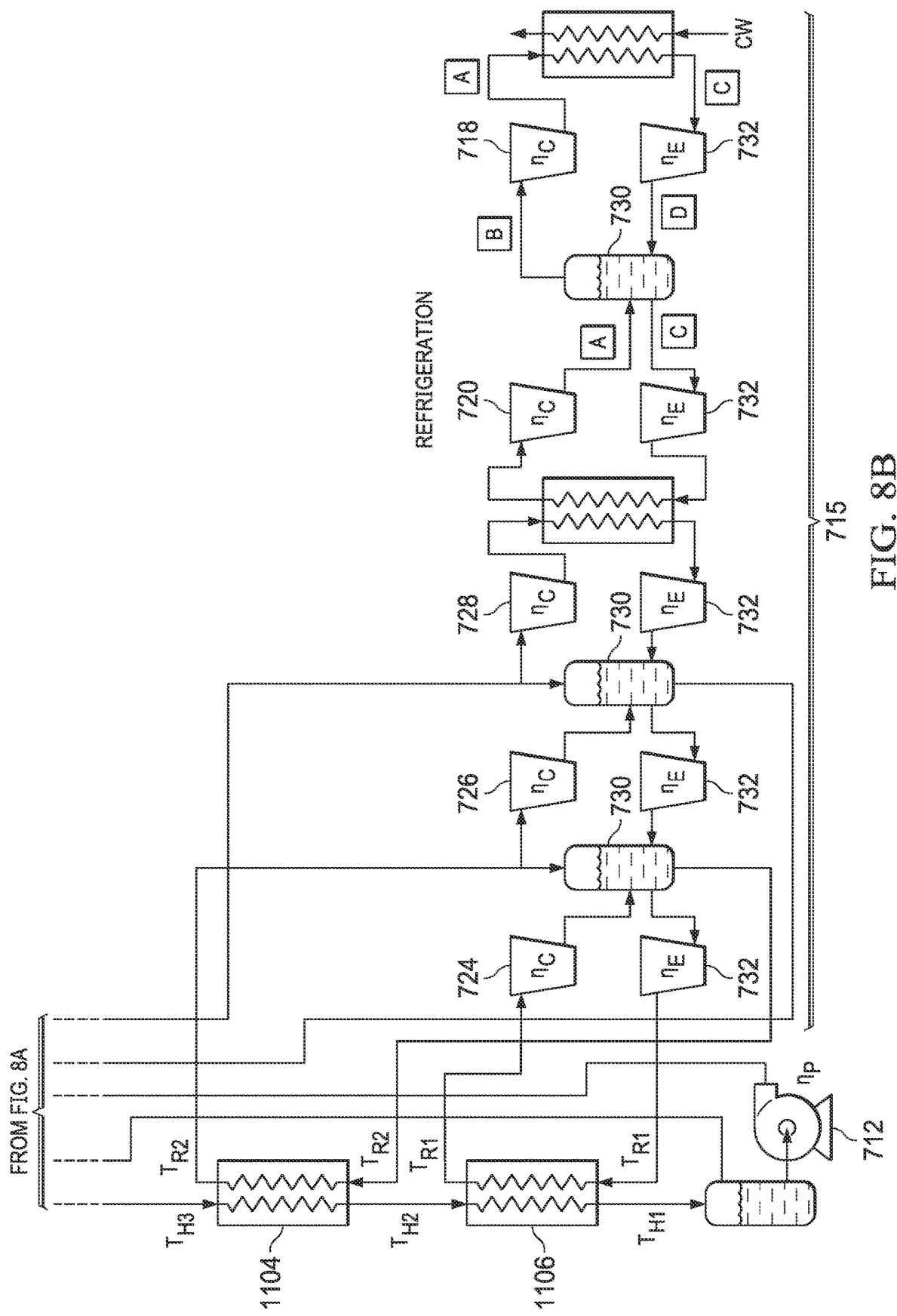

FIGS. 8A-B are a schematic diagram of a process 1200 that separates $CO_2$ and $SO_2$ from flue gas wherein a third condenser section 1202 is utilized that operates at a higher temperature than the first condenser section 1104 and the second condenser section 1106. In various embodiments, the third condenser section 1202 employs liquid refrigerant from an intermediate stage in the refrigeration system 715 that operates at the required temperature. In various embodiments, the introduction of the third condenser section 1202 allows a first countercurrent heat exchanger 1204 and a second countercurrent heat exchanger 1206 to operate with a closer approach temperature while avoiding a "pinch" in the first countercurrent heat exchanger 1204 and the second countercurrent heat exchanger 1206. The term "pinch" is used to refer to instances when the temperature on each side of the heat exchanger becomes identical, thereby preventing further transfer of heat. Because of the close approach temperatures, the embodiment shown in FIG. 8 operates with higher efficiency.

Figure 9A:
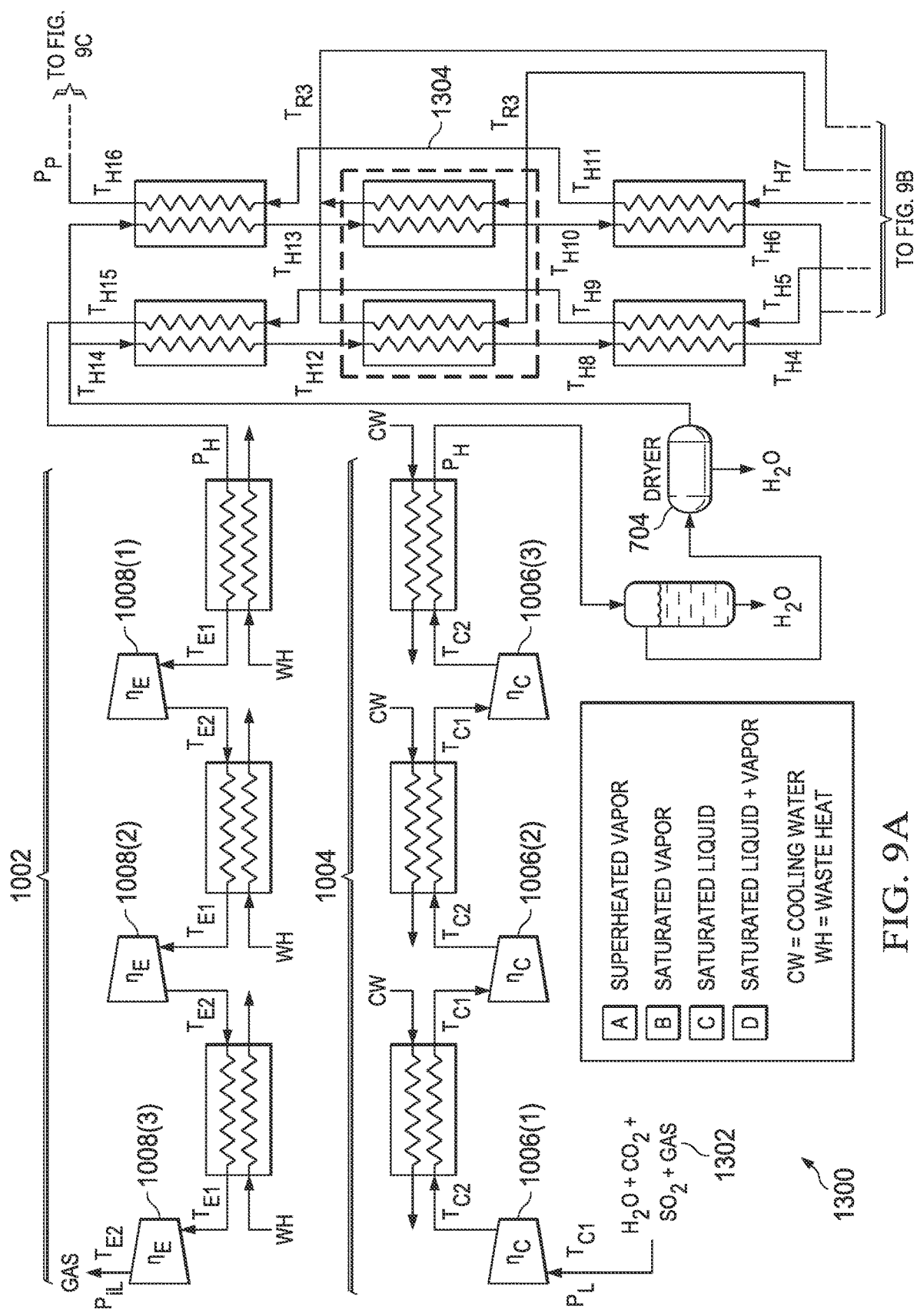

FIGS. 9A-9C are a schematic diagram of a process 1300 that separates $CO_2$ and $SO_2$ from flue gas 1302 wherein liquid 1304 is pressurized to a higher pressure thereby allowing the introduction of an expander 1306 that produces work in a manner similar to the embodiment as described in FIG. 4.

The embodiments illustrated in FIGS. 3-9 employ high-pressure condensers which increase the condensation temperature, and thereby reduces the energy required by the refrigeration system 715. In the embodiments illustrated in FIGS. 3-9, generally large volumes of gas are processed. In principle, conventional compressors and expanders could be employed; however, if volumes are large, the capital cost would be prohibitive. This challenge can be overcome by using, for example, axial fans. Such fans typically operate with a low-pressure ratio of about 1.05 and efficiencies of about 90%.

Figure 10:
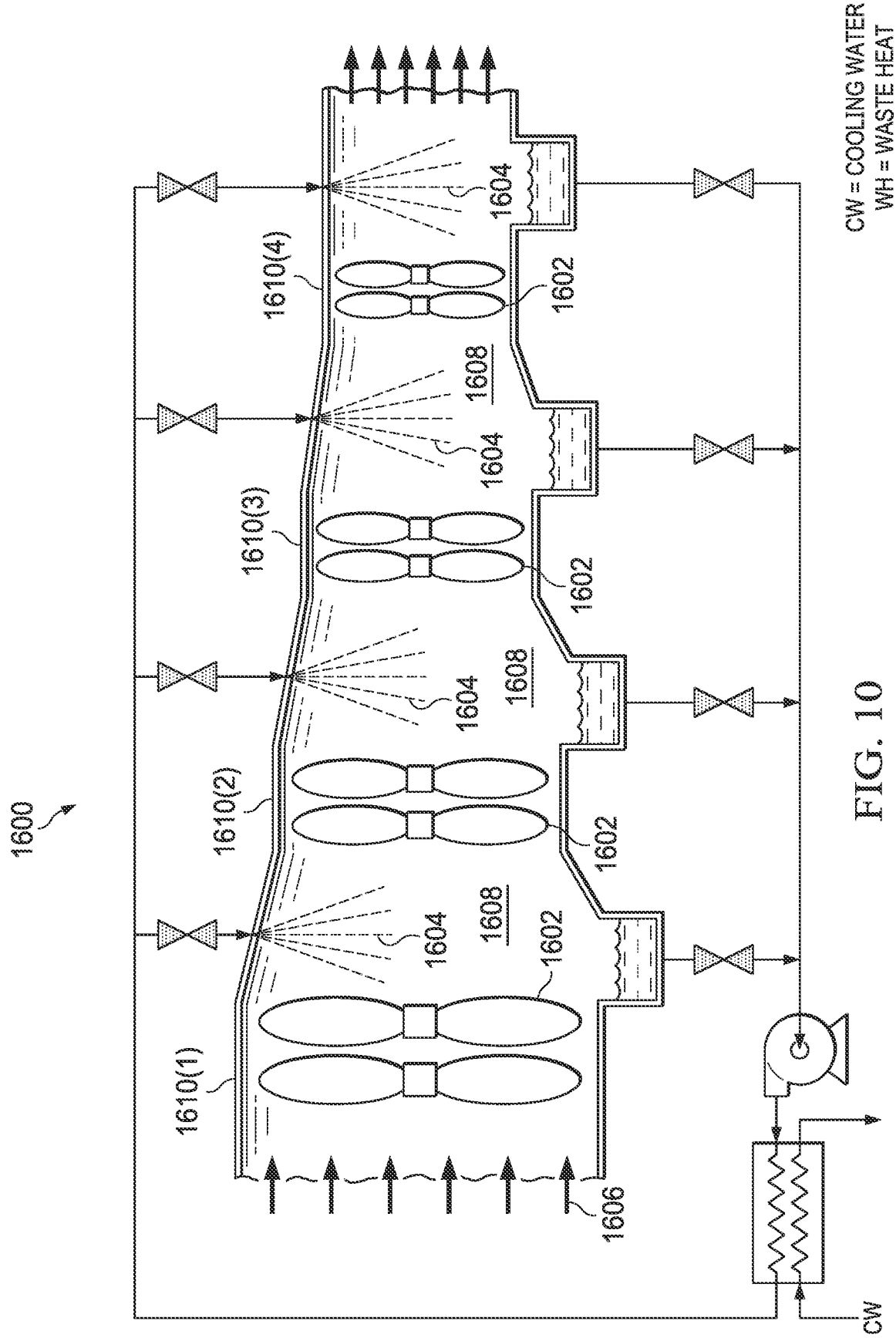
FIG. 10 is a cross-sectional view of multi-stage compression using axial fans with interstage cooling according to aspects of the disclosure.
Figure 11:
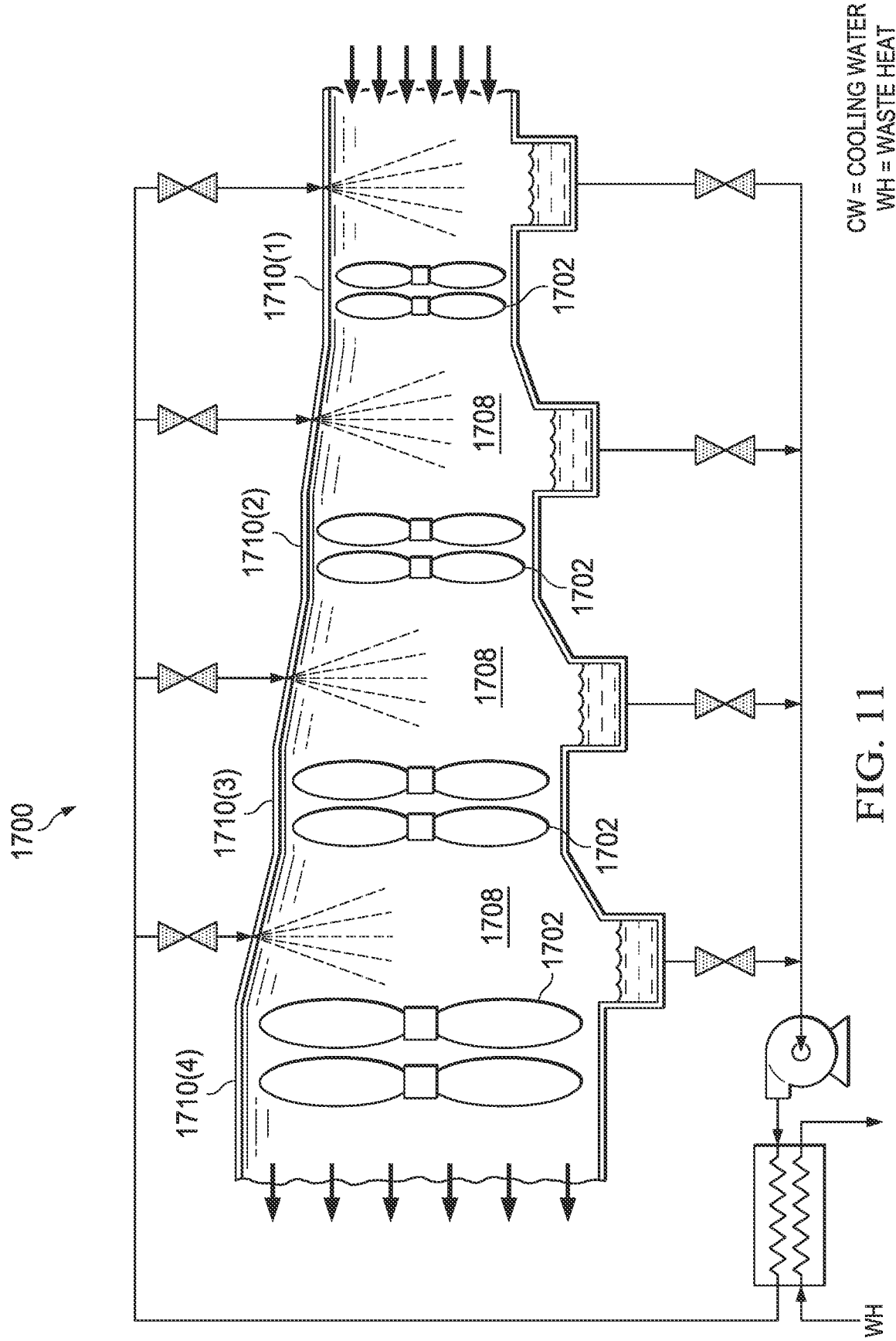
FIG. 11 is a cross-sectional view of multi-stage expansion using axial fans with interstage heating according to aspects of the disclosure.

FIG. 10 is a cross-sectional schematic diagram of a compressor 1600. FIG. 11 is cross-sectional schematic diagram of an expander 1700. Referring to FIGS. 10-11 collectively, because the per-stage pressure ratio is low, in various embodiments, several fans 1602 may be employed together to achieve a significant total pressure ratio (FIG. 10).

In the case of the expanders 1700, the fans 1702 may be modified and operate in reverse as expanders (FIG. 11).

To improve energy efficiency, the compressors 1600 can be intercooled and the expanders 1700 can be interheated. In various embodiments, metal-walled heat exchangers could be employed; however, the expense would be large as the gas heat transfer coefficients are low. To overcome this problem, the heat transfer can, in various embodiments, be made with liquid water 1604 that is then directly contacted with the gas 1606. As shown in FIGS. 10 and 11, the water 1604 is sprayed to form high-surface-area droplets that facilitate heat transfer. Alternatively, in various embodiments, space 1608 between the compression stages 1610 (1)-(4) may have, for example, a structured packing or dumped packing that facilitates contact between the liquid water and gas. Similarly, in the case of the expanders 1700, space 1708 between the expansion stages 1710(1)-(4) may have, for example, a structured packing or dumped packing that facilitates contact between the liquid water and gas Still referring to FIGS. 10-11, because the per-stage pressure ratio of an axial fan is low, it is not necessary to intercool between each of the fans 1602 or, in the case of the expander 1700, interheat between each of the fans 1702. Instead, in various embodiments, the fans 1602 and 1702 can be clustered together in groups with intercooling disposed between the groups. As an example, in FIG. 10, the fans 1602 are grouped into groups of two fans 1602; however, the groupings can be larger. For example, a group of four fans will have an overall pressure ratio of 1.21. In various embodiments, between each fan blade, stators can be used to improve fan efficiency. Similarly, the fans 1702 associated with the expanders 1700 can be clustered into groups in a similar fashion.

Table 1 lists the assumptions employed in a simulation and Table 2 describes the refrigeration cycle in more detail. Tables 3a to 3h describe the energy consumption under a variety of assumed temperatures and efficiencies. For example, if waste heat is available at 95° C., compression occurs at 25° C., the compressor efficiencies are 85%, and the expander efficiencies are 87%, the energy consumption is 26.80 kJ/mol, or 1.63 times the theoretical at 90% recovery (16.49 kJ/mol). In this scenario, the energy cost per tonne of captured and sequestered $CO_2$ follows (Equation 6):

$$\text{Cost} = \frac{26.80 \text{ kJ}}{\text{mol}} \times \frac{\text{mol}}{0.04401 \text{ kg}} \times \frac{1000 \text{ kg}}{\text{tonne}} \times \frac{\text{kWh}}{3600 \text{ kJ}} \times \frac{\$0.05}{\text{kWh}} = \frac{\$8.46}{\text{tonne } CO_2} \quad \text{Equation 6}$$

TABLE 1

Assumptions in energy analysis

| | |
|---|---|
| Option = F | $T_{H1} = T_{H5} = -110.00°$ C. |
| gas feed = 84.8 mol % (dry basis, modeled as $N_2$) | $T_{H2} = -97.70°$ C. |
| $CO_2$ feed = 15 mol % (dry basis) | $T_{H3} = -83.90°$ C. |
| $SO_2$ feed = 0.2 mol % (dry basis) | $T_{H4} = -84.82°$ C. |
| $CO_2$ recovery = 90.9% | $T_{H6} = -81.76°$ C. |
| $SO_2$ recovery = 99.96% | $T_{H7} = -105.55°$ C. |
| Flue gas compressor stages = 15 stages with intercoolers | $T_{H8} = -69.18°$ C. |
| Per-stage pressure ratio = 1.21 | $T_{H9} = T_{H11} = -70.00°$ C. |
| $\eta_E + \eta_C + 2\%$ | $T_{H10} = -69.45°$ C. |
| $\eta_P = 90\%$ | $T_{H12} = T_{H13} = -63.00°$ C. |
| $P_H = 17$ bar | $T_{H14} = 35.00°$ C. |
| $P_S = 350$ bar | $T_{H15} = 13.81°$ C. |
| Refrigerant 1 = propane (5 stages) | $T_{H16} = 15.75°$ C. |
| Refrigerant 2 = ethylene (4 stages) | |

TABLE 2

Refrigeration cycle used in the sensitivity analysis.

| Refrigerant | Stage | Compressors Code | T (° C.) | P (bar) | Expanders Code | T (° C.) | P (bar) |
|---|---|---|---|---|---|---|---|
| Ethylene | 1 | EC1 | −111 | 0.635 | EE1 | −54.47 | 10.16 |
| | 2 | EC2 | −99.56 | 1.27 | EE2 | −70.38 | 5.08 |
| | 3 | EC3 | −86.19 | 2.54 | EE3 | −86.19 | 2.54 |
| | 4 | EC4 | −70.38 | 5.08 | EE4 | −99.56 | 1.27 |
| Propane | 1 | PC1 | −52.5 | 0.612 | PE1 | 30.72 | 11.1 |
| | 2 | PC2 | −37.39 | 1.22 | PE2 | 25.79 | 9.8 |
| | 3 | PC3 | −19.78 | 2.45 | PE3 | 1.003 | 4.9 |
| | 4 | PC4 | 1.003 | 4.9 | PE4 | −19.78 | 2.45 |
| | 5 | PC5 | 25.79 | 9.8 | PE5 | −37.39 | 1.22 |

NOTE:
1. All the temperature and pressure are at the inlet conditions of the corresponding compressors and expanders.
2. Number of the compressors are from low pressure to high pressure, whereas the number of the expanders are from the high pressure to low pressure.

TABLE 3a $N_2$ expander inlet temperature: $T_{E1}$ 35° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 60.56 | 61.97 | 63.37 | 64.77 | 66.17 | 67.56 | 68.96 | 70.35 |
| 0.70 | 52.00 | 53.30 | 54.60 | 55.90 | 57.20 | 58.50 | 59.80 | 61.09 |
| 0.75 | 44.28 | 45.50 | 46.71 | 47.93 | 49.14 | 50.35 | 51.56 | 52.77 |
| 0.80 | 37.26 | 38.40 | 39.53 | 40.67 | 41.81 | 42.94 | 44.08 | 45.21 |
| 0.85 | 30.79 | 31.87 | 32.94 | 34.01 | 35.08 | 36.15 | 37.21 | 38.28 |

TABLE 3a-continued $N_2$ expander inlet temperature: $T_{E1}$ 35° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.90 | 24.81 | 25.82 | 26.83 | 27.84 | 28.85 | 29.86 | 30.87 | 31.88 |
| 0.92 | 22.52 | 23.52 | 24.51 | 25.49 | 26.48 | 27.47 | 28.46 | 29.44 |

TABLE 3b $N_2$ expander inlet temperature: $T_{E1}$ 55° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 58.71 | 60.11 | 61.51 | 62.91 | 64.31 | 65.71 | 67.11 | 68.50 |
| 0.70 | 50.01 | 51.31 | 52.61 | 53.91 | 55.21 | 56.51 | 57.80 | 59.10 |
| 0.75 | 42.15 | 43.37 | 44.58 | 45.80 | 47.01 | 48.22 | 49.43 | 50.64 |
| 0.80 | 34.99 | 36.13 | 37.26 | 38.40 | 39.54 | 40.67 | 41.81 | 42.94 |
| 0.85 | 28.39 | 29.45 | 30.53 | 31.60 | 32.67 | 33.74 | 34.81 | 35.87 |
| 0.90 | 22.26 | 23.27 | 24.28 | 25.30 | 26.31 | 27.31 | 28.32 | 29.33 |
| 0.92 | 19.92 | 20.91 | 21.90 | 22.89 | 23.88 | 24.87 | 25.86 | 26.84 |

TABLE 3c $N_2$ expander inlet temperature: $T_{E1}$ 75° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 56.86 | 58.26 | 59.66 | 61.06 | 62.46 | 63.86 | 65.26 | 66.65 |
| 0.70 | 48.02 | 49.32 | 50.62 | 51.92 | 53.22 | 54.52 | 55.82 | 57.11 |
| 0.75 | 40.03 | 41.24 | 42.46 | 43.67 | 44.88 | 46.09 | 47.30 | 48.51 |
| 0.80 | 32.72 | 33.86 | 35.00 | 36.14 | 37.27 | 38.41 | 39.54 | 40.68 |
| 0.85 | 25.99 | 27.06 | 28.13 | 29.20 | 30.27 | 31.34 | 32.40 | 33.47 |
| 0.90 | 19.72 | 20.73 | 21.74 | 22.75 | 23.76 | 24.77 | 25.78 | 26.79 |
| 0.92 | 17.33 | 18.32 | 19.31 | 20.30 | 21.29 | 22.27 | 23.26 | 24.25 |

TABLE 3d $N_2$ expander inlet temperature: $T_{E1}$ 95° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 55.01 | 56.42 | 57.82 | 59.22 | 60.61 | 62.01 | 63.41 | 64.80 |
| 0.70 | 46.04 | 47.34 | 48.64 | 49.94 | 51.24 | 52.53 | 53.83 | 55.13 |
| 0.75 | 37.90 | 39.12 | 40.33 | 41.55 | 42.76 | 43.97 | 45.18 | 46.39 |
| 0.80 | 30.46 | 31.60 | 32.74 | 33.88 | 35.01 | 36.15 | 37.28 | 38.42 |
| 0.85 | 23.59 | 24.66 | 25.73 | 26.80 | 27.87 | 28.94 | 30.01 | 31.07 |
| 0.90 | 17.18 | 18.20 | 19.21 | 20.22 | 21.23 | 22.24 | 23.25 | 24.25 |
| 0.92 | 14.74 | 15.73 | 16.72 | 17.71 | 18.69 | 19.68 | 20.67 | 21.65 |

TABLE 3e $N_2$ expander inlet temperature: $T_{E1}$ 115° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 53.17 | 54.57 | 55.97 | 57.37 | 58.77 | 60.17 | 61.56 | 62.96 |
| 0.70 | 44.05 | 45.35 | 46.66 | 47.95 | 49.25 | 50.55 | 51.85 | 53.14 |
| 0.75 | 35.78 | 37.00 | 38.21 | 39.43 | 40.64 | 41.85 | 43.06 | 44.27 |
| 0.80 | 28.20 | 29.34 | 30.48 | 31.62 | 32.75 | 33.89 | 35.02 | 36.16 |
| 0.85 | 21.19 | 22.26 | 23.33 | 24.40 | 25.47 | 26.54 | 27.61 | 28.68 |
| 0.90 | 14.65 | 15.66 | 16.67 | 17.68 | 18.69 | 19.70 | 20.71 | 21.72 |
| 0.92 | 12.15 | 13.14 | 14.13 | 15.12 | 16.11 | 17.09 | 18.08 | 19.06 |

TABLE 3f $N_2$ expander inlet temperature: $T_{E1}$ 125° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 52.25 | 53.65 | 55.05 | 56.45 | 57.85 | 59.24 | 60.64 | 62.04 |
| 0.70 | 43.06 | 44.36 | 45.66 | 46.96 | 48.26 | 49.56 | 50.86 | 52.15 |
| 0.75 | 34.72 | 35.94 | 37.15 | 38.37 | 39.58 | 40.79 | 42.00 | 43.21 |
| 0.80 | 27.08 | 28.21 | 29.35 | 30.49 | 31.63 | 32.76 | 33.90 | 35.03 |
| 0.85 | 19.99 | 21.07 | 22.14 | 23.21 | 24.28 | 25.34 | 26.41 | 27.48 |
| 0.90 | 13.38 | 14.40 | 15.41 | 16.42 | 17.43 | 18.44 | 19.45 | 20.45 |
| 0.92 | 10.85 | 11.84 | 12.83 | 13.82 | 14.81 | 15.80 | 16.79 | 17.77 |

TABLE 3g $N_2$ expander inlet temperature: $T_{E1}$ 135° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 51.32 | 52.73 | 54.13 | 55.53 | 56.93 | 58.32 | 59.72 | 61.11 |
| 0.70 | 42.07 | 43.37 | 44.67 | 45.97 | 47.27 | 48.57 | 49.87 | 51.16 |
| 0.75 | 33.67 | 34.88 | 36.09 | 37.31 | 38.52 | 39.73 | 40.94 | 42.15 |
| 0.80 | 25.95 | 27.09 | 28.22 | 29.36 | 30.50 | 31.63 | 32.77 | 33.90 |
| 0.85 | 18.80 | 19.87 | 20.94 | 22.01 | 23.08 | 24.15 | 25.22 | 26.28 |
| 0.90 | 12.12 | 13.13 | 14.14 | 15.15 | 16.16 | 17.17 | 18.18 | 19.19 |
| 0.92 | 9.56 | 10.55 | 11.54 | 12.53 | 13.52 | 14.51 | 15.49 | 16.48 |

TABLE 3h $N_2$ expander inlet temperature: $T_{E1}$ 155° C.
Total energy consumption (kJ/mole of captured $CO_2$)

| Efficiency | Flue gas compressor inlet temperature, $T_{CI}$ (° C.) | | | | | | | |
|---|---|---|---|---|---|---|---|---|
| ($\eta_C$) | 10 | 15 | 20 | 25 | 30 | 35 | 40 | 45 |
| 0.65 | 49.48 | 50.88 | 52.28 | 53.68 | 55.08 | 56.48 | 57.88 | 59.27 |
| 0.70 | 40.09 | 41.39 | 42.69 | 43.99 | 45.29 | 46.59 | 47.89 | 49.18 |
| 0.75 | 31.55 | 32.76 | 33.98 | 35.19 | 36.40 | 37.61 | 38.82 | 40.03 |
| 0.80 | 23.69 | 24.83 | 25.97 | 27.11 | 28.24 | 29.38 | 30.51 | 31.65 |
| 0.85 | 16.40 | 17.47 | 18.55 | 19.62 | 20.69 | 21.75 | 22.82 | 23.89 |
| 0.90 | 9.59 | 10.60 | 11.61 | 12.62 | 13.63 | 14.64 | 15.65 | 16.66 |
| 0.92 | 6.97 | 7.97 | 8.96 | 9.94 | 10.93 | 11.92 | 12.91 | 13.89 |

Should it be possible to realize compressor efficiencies of 90%, under the same temperature assumptions, the energy consumption is 20.22 kJ/mol and the cost would reduce to $6.38/tonne $CO_2$. In the winter, if the compression temperature is 10° C. and compressor efficiency is still 90%, then the energy consumption is 17.18 kJ/mol, and the cost would reduce to $5.42/tonne $CO_2$.

Figure 12:
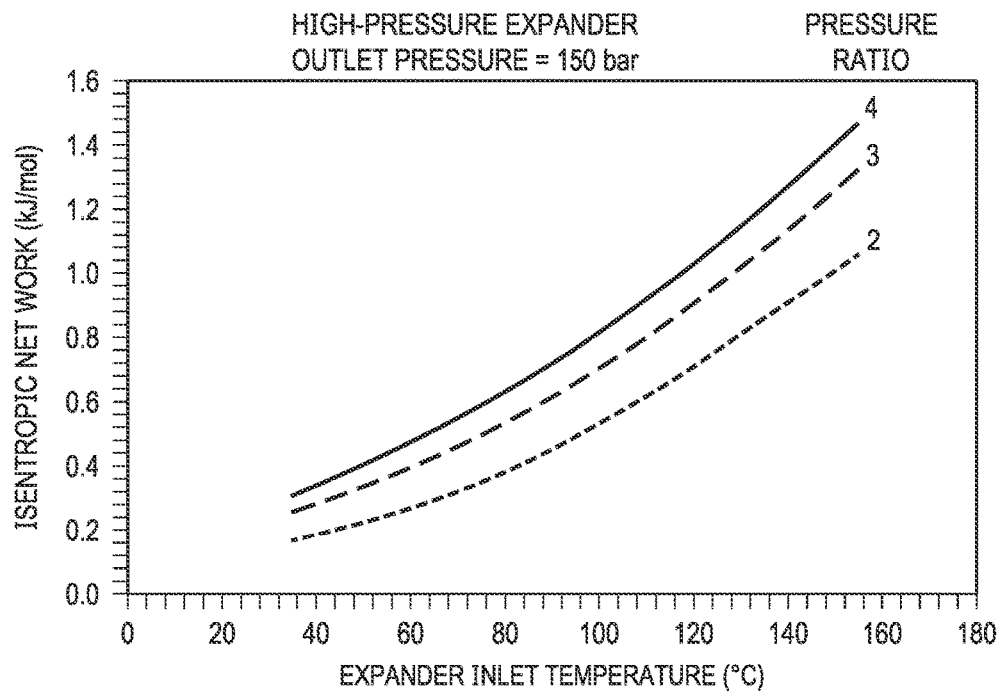
FIG. 12 is a graph of the net isentropic work produced by a high-pressure expander according to aspects of the disclosure.

FIG. 12 shows that at 95° C. and pressure ratio of 4, the isentropic work produced by the high-pressure expanders utilized in the embodiments illustrated in FIGS. 4 and 9 is 0.8 kJ/mol. In practice, about 85% of this can be realized, or 0.68 kJ/mol. If implemented, this would reduce energy costs by $0.21/tonne. Table 4 shows a recommended refrigeration cycle that minimizes the size of the compressors and expanders, thereby reducing capital costs.

TABLE 4

Recommended refrigeration cycle.

| Refrigerant | Stage | Compressors | | | Expanders | | |
|---|---|---|---|---|---|---|---|
| | | Code | T (° C.) | P (bar) | Code | T (° C.) | P (bar) |
| Methane | 1 | MC1 | −115 | 14.92 | ME1 | −83.5 | 44.76 |
| | 2 | MC2 | −96.37 | 29.84 | ME2 | −96.37 | 29.84 |
| Ethylene | 1 | EC1.1 EC1.2 EC1.3 | −88.49 | 2.27 | EE1 | −5.06 | 36.35 |
| | 2 | EC2.1 EC2.2 | −73.12 | 4.54 | EE2 | −32.62 | 18.178 |
| | 3 | EC3 | −54.77 | 9.08 | EE3 | −54.77 | 9.088 |
| | 4 | EC4 | −32.62 | 18.178 | EE4 | −73.12 | 4.54 |
| Ammonia | 1 | AC1 | −11 | 2.74 | AE1 | 52.64 | 21.94 |
| | 2 | AC2 | 6.91 | 5.48 | AE2 | 27.87 | 10.97 |
| | 3 | AC3 | 27.87 | 10.97 | AE3 | 6.91 | 5.48 |

NOTE:
1. All the temperature and pressure are at the inlet conditions of the corresponding compressors and expanders.
2. Number of the compressors are from low pressure to high pressure. whereas the number of the expanders are from the high pressure to low pressure.

It should be noted that for coal-fired power plants, the $SO_2$ scrubbers can be eliminated, which reduces the effective cost of carbon capture and sequestration. Furthermore, cost savings can be realized by eliminating methods that remove nitrogen oxides from flue gas.

As the flue gas is chilled, it has the potential to form frost on the heat exchangers, which will reduce the heat transfer coefficient.

Figure 13:
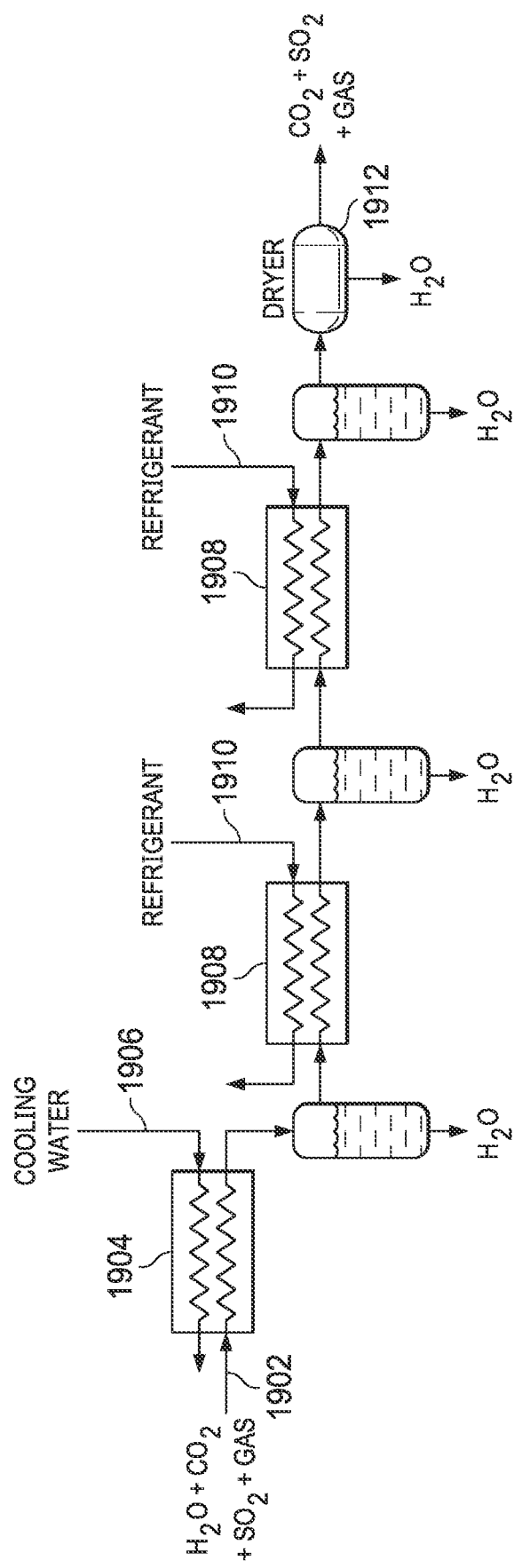
FIG. 13 is a schematic diagram of a first option for dehydrating the flue gas according to aspects of the disclosure.

As mentioned previously, there are many options for dehydrating the flue gas. FIG. 13 is a schematic diagram of a first option for dehydrating the flue gas. First, flue gas 1902 is cooled in a first heat exchanger 1904 against cooling water 1906, which cooling removes most of the water present in the flue gas 1902. In sequence, the flue gas 1902 flows through heat exchangers 1908 at progressively lower temperatures, which condenses more water from the flue gas 1902. For the heat exchangers 1908 that operate below cooling water temperatures, a convenient source of refrigerant is the multi-stage refrigeration system 715 used to condense the $CO_2$ and $SO_2$ and described with respect to FIG. 3. At the appropriate temperatures, liquid refrigerant streams 1910 can be pulled from the intermediate stages and used for refrigeration. At 0° C., the vapor pressure of water is 0.611 kPa (622 Pa), which is the minimum achievable partial pressure of water using this technology. In various embodiments, additional water removal can be accomplished with desiccants such as, for example, silica gel, which are used in a drier 1912.

Compared to solid desiccants, liquid desiccants are desirable because it is possible to change the temperature in a nearly reversible manner. Such reversibility reduces energy requirements during regeneration. A common desiccant used in absorption refrigeration is, for example, an aqueous solution of lithium bromide (LiBr). In various embodiments, the lithium bromide significantly depresses the freezing point. The lowest freezing point is approximately −70° C., which occurs at approximately 40% LiBr. In various embodiments, this reduction in freezing point allows aqueous LiBr to serve as a low-temperature desiccant.

The vapor pressure over various concentrations of LiBr as a function of temperature follows the Clausius-Clapeyron equations, which means a plot of lnP vs. 1/T is linear, where both T and P must be absolute. For example, at 25° C., the vapor pressure over 60% LiBr is 0.263 kPa (263 Pa, frost temperature=−10° C.). Generally, this temperature can be achieved with cooling water. Such a system would achieve a water vapor pressure 2.3 times lower than the best that can be achieved using a refrigeration system (shown in FIG. 13) operating at 0° C.

Figure 14:
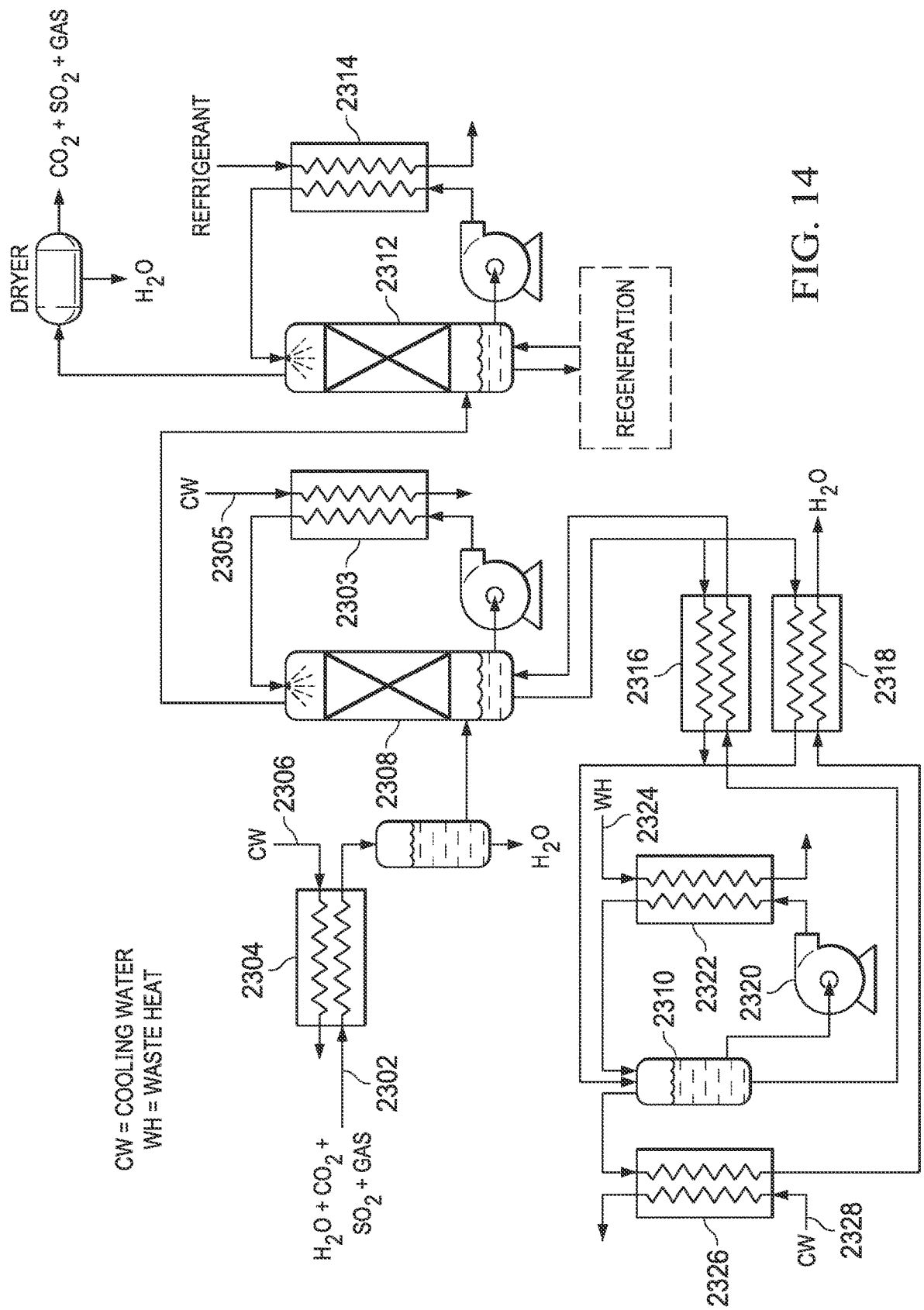
FIG. 14 is a schematic diagram of a second option for dehydrating the flue gas utilizing aqueous salt desiccants, such as LiBr, according to aspects of the disclosure.

FIG. 14 is a schematic diagram of a system for dehydrating flue gas 2302, utilizing aqueous salt desiccants, such as LiBr. First, the flue gas 2302 is cooled in a first heat exchanger 2304 against cooling water 2306, which cooling condenses a majority of the water present in the flue gas 2302. Then, the flue gas 2302 is further dehydrated using a LiBr solution. As shown in FIG. 14, two stages of LiBr dehydration are employed; however, it is understood that more or fewer stages may be employed. In this example, Stage 1 contactor rejects the heat of condensation to cooling water and Stage 2 contactor rejects the heat of condensation to refrigerant. Stage 1 employs contactor 2308, which uses a second heat exchanger 2303 that exchanges heat with cooling water 2305. For example, if the salt solution were 25° C. and 60% LiBr, the vapor pressure of water exiting a first contactor 2308 would be 0.263 kPa (263 Pa, frost temperature=−10° C.).

To regenerate the LiBr in the first contactor 2308, a stream is removed and sent to a thermal evaporator 2310, shown in FIG. 14 as a single-stage evaporator. In various embodiments, a multi-stage evaporator could be used, for example in an effort to conserve energy. In this scenario, it is assumed that waste heat is available to evaporate water from the LiBr solution, and thereby regenerate it. Liquid from the contactor 2308 flows through sensible heat exchangers 2316 and 2318, which preheats the liquid to the temperature of the thermal evaporator 2310. Via pump 2320, the liquid contents of thermal evaporator 2310 are circulated through heat exchanger 2322, which employs waste heat (WH) 2324 to evaporate water. The resultant water vapors are condensed in heat exchanger 2326, which rejects heat to cooling water (CW) 2328. Sensible heat exchangers 2316 and 2318 exchange thermal energy between the incoming and outgoing streams, which conserves energy.

The gas exiting the first contactor 2308 flows to a second contactor 2312, which operates at a lower temperature by exchanging heat with a refrigerant in a second heat exchanger 2314. In various embodiments, a convenient source of refrigerant is the multi-stage refrigeration system 715 used to condense the $CO_2$ and $SO_2$. A liquid refrigerant stream could be pulled from one of the intermediate stages and used for refrigeration. For example, if the salt solution were approximately 50% LiBr and the operating temperature was approximately 0° C., the vapor pressure of water exiting the second contactor 2312 would be approximately 0.153 kPa (153 Pa, frost temperature=approximately −16° C.). This vapor pressure is approximately 4 times lower than a refrigeration system 1900 (shown in FIG. 13) operating at approximately 0° C. The brine in the second contactor 2312 could be regenerated in a manner similar to the regeneration system employed in the first contactor 2308. Gas exiting the second contactor 2312 is further dehydrated using a solid desiccant, or other suitable drying technology.

Figure 15:
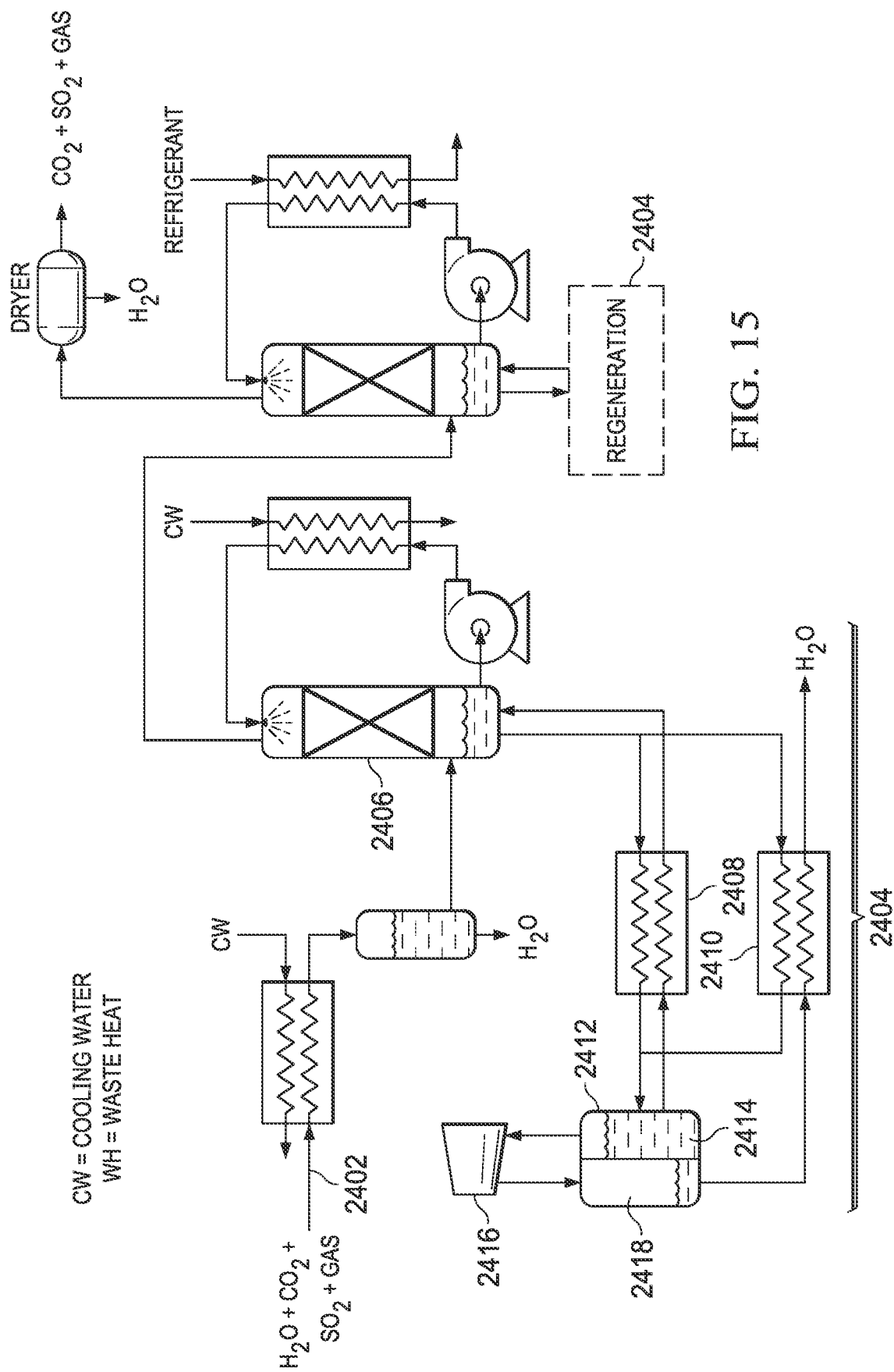
FIG. 15 is a schematic diagram of a third option for dehydrating the flue gas wherein the regeneration systems employ vapor-compression evaporation according to aspects of the disclosure.

FIG. 15 is a schematic diagram of a two-stage dehydration system for dehydrating flue gas 2402, which is analogous to the system described with respect to FIG. 14, with the exception of a salt regeneration system 2404 vapor-compression evaporation being employed, which is a work-driven process. In contrast, to the embodiment shown in FIG. 14, the regeneration system 2404 is a heat-driven process. Either can be employed, depending upon the most economical option for a given situation. FIG. 15 illustrates the dehydration system with two stages; however, in various embodiments, fewer or more stages could be employed. Liquid from contactor 2406 flows through two sensible heat exchangers 2408 and 2410, which preheats the liquid to the evaporation temperature. Evaporation occurs in latent heat exchanger 2412. A low-pressure side 2414 contains the salt solution and operates at a lower temperature. The water vapors from the low-pressure side 2414 enter compressor 2416, which pressurizes the water vapors. The high-pressure vapors enter a high-pressure side 2418 at an elevated temperature. Heat transfers from the hot high-pressure side 2418 to the colder low-pressure side 2414, which causes water vapor to condense in the high-pressure side 2418. Sensible heat exchangers 2408 and 2410 exchange thermal energy between the incoming and outgoing streams, which conserves energy.

As shown in Table 7, to prevent ice formation in heat exchangers as the flue gas cools, it is necessary for the partial pressure of water vapor to be extremely low. When employed by themselves, neither direct refrigeration (shown in FIG. 13) nor LiBr adsorption (FIGS. 23-24) can reduce the water vapor pressure sufficiently to prevent ice formation in the heat exchanger. In all these options, an additional step—a drier—is required.

At high humidities (i.e., high partial pressures of water), silica gel has a higher capacity. In contrast, at low humidities (i.e., low partial pressures of water), molecular sieves (i.e., zeolites) have a higher capacity. When selecting the appropriate adsorbent, it is necessary to consider the potential adverse impact of co-adsorbing carbon dioxide with the water. Silica gel is more selective towards adsorbing water; thus, in various embodiments, silica gel is utilized as the adsorbent.

The loading (q*) of water onto Type 3A silica gel decreases at lower pressures and higher temperatures. The loading of water onto silica gel is described by Equation 7:

$$q^* = K(T)P \qquad \text{Equation 7:}$$

where P is the partial pressure of water vapor and K(T) is the slope of the line (Table 8).

TABLE 8

Constants that describe the adsorption of water on Type 3A silica gel.

| Temperature (° C.) | K(T) |
| --- | --- |
| 30 | 0.0001315 |
| 35 | 0.0001019 |
| 40 | 0.00008105 |
| 50 | 0.00004629 |
| 65 | 0.00002222 |

Figure 16:
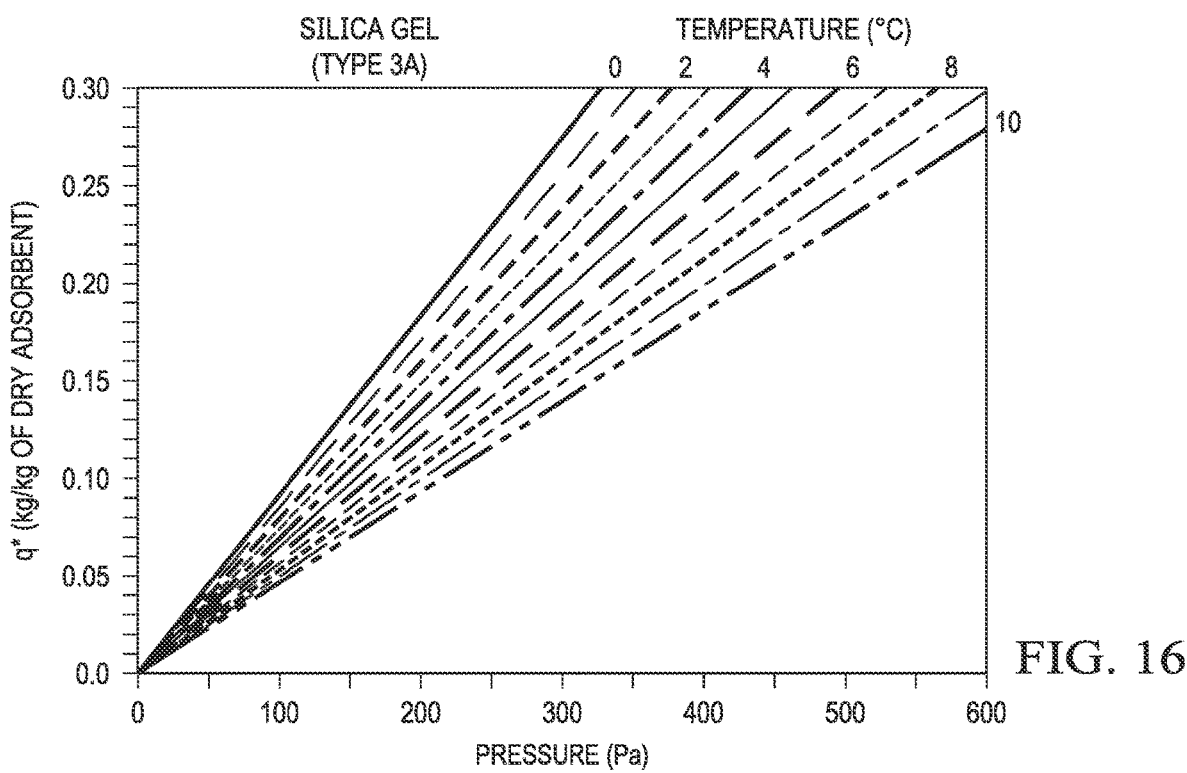
FIG. 16 is a graph of the calculated loading of water onto Type 3A silica gel as a function of water partial pressure and temperatures ranging from 0 to 10° C. according to aspects of the disclosure.

The slope K(T) correlates with temperature according to Equation 8:

$$K(T) = \kappa \exp(k/T) \qquad \text{Equation 8:}$$

where κ and k are empirical constants determined from fitting the model to the data. FIG. 16 shows the calculated water loadings as a function of pressure at temperatures ranging from 0 to 10° C.

Typically, adsorbents are placed in a packed column through which the gas flows. In the current application, the volumetric flow of flue gas is large, so if this packed-column approach were utilized, the superficial velocity of the flue gas through the adsorbent would be very large and would lead to an unacceptable pressure drop. To address this problem, in various embodiments, the surface area of the adsorbent bed is be increased, which lowers the superficial velocity and reduces the adsorbent bed depth, both of which lower the pressure drop.

Figure 17A:
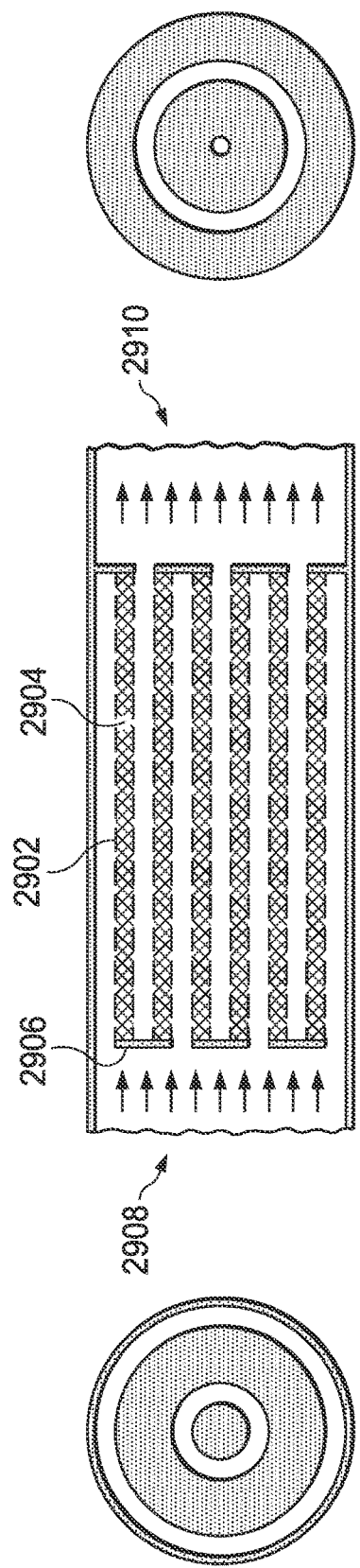
FIG. 17A is a schematic diagram of adsorbent vessels with beds of adsorbent arranged in cylindrical configurations according to aspects of the disclosure.
Figure 17B:
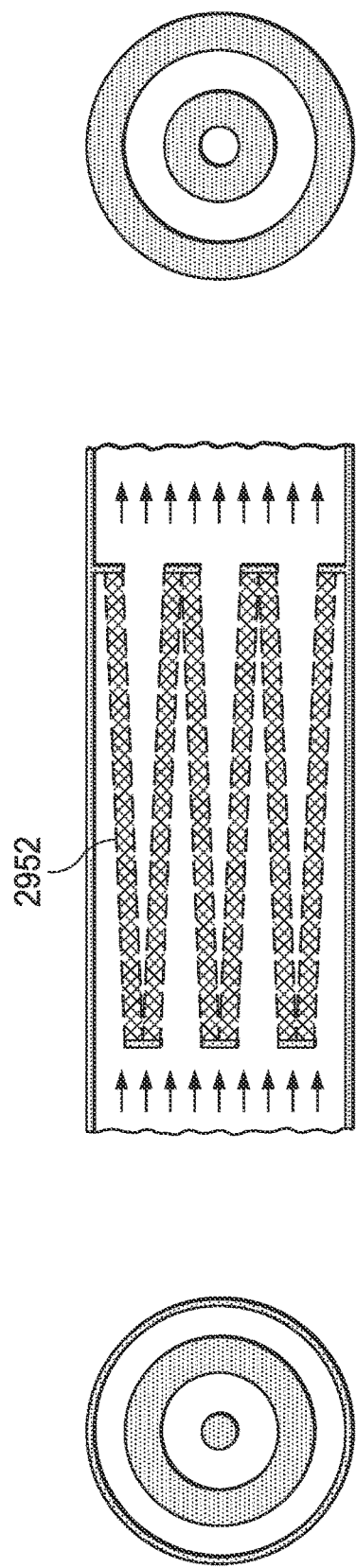
FIG. 17B is a schematic diagram of adsorbent vessels with beds of adsorbent arranged in conical configurations according to aspects of the disclosure.

FIG. 17A shows a series of concentric porous cylindrical tubes 2902 in which every other annular space is filled with adsorbent 2904. The ends are blocked off with end plates 2906 that allow the gas to enter a left end 2908 and exit a right end 2910. FIG. 17A shows that a substantial portion of the end plates 2906 is solid, which reduces flow area and increases pressure drop. FIG. 17B shows an alternative embodiment in which porous tubes 2952 are conical, which reduces the area that is blocked off by the end plates 2956 and thereby reduces pressure drop.

Figure 18B:
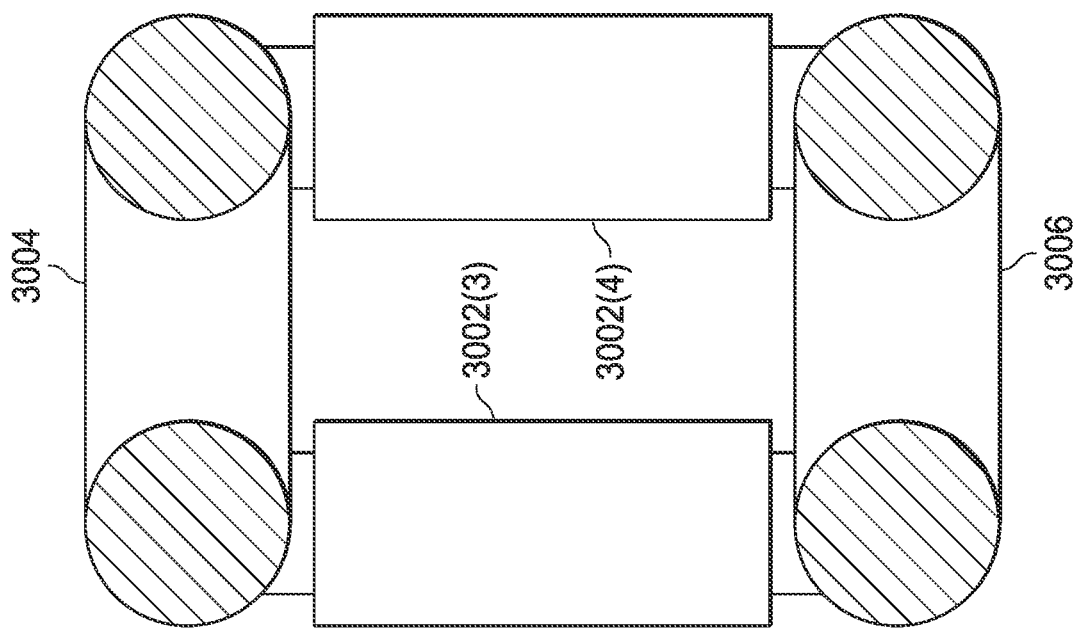
FIG. 18B is a side cross-sectional view, taken along line A-A of the six adsorbent beds of FIG. 18A according to aspects of the disclosure.
Figure 18A:
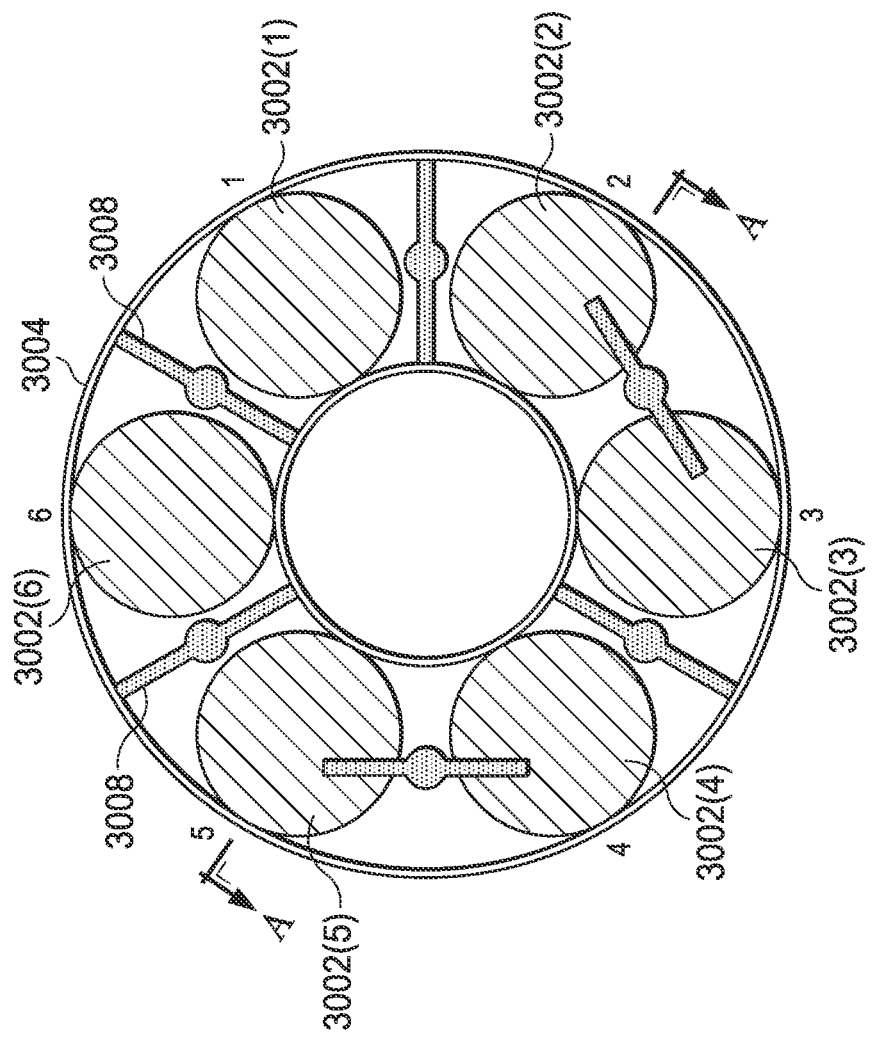
FIG. 18A is a top view of six adsorbent beds according to aspects of the disclosure.

FIG. 18A shows a top view of six adsorbent vessels. FIG. 18B is a side cross-sectional view, taken along line A-A, of the adsorbent vessels of FIG. 18A. Vertical vessels 3002(1)-(6) are arranged in a circular configuration with a top hollow torus 3004 and a bottom hollow torus 3006 that connect the vertical vessels 3002(1)-(6) together. Each hollow torus (3004, 3006) contains valves 3008 that can be, for example, butterfly valves, which regulate the flow through the top hollow torus 3004 and the bottom hollow torus 3006. By opening and closing appropriate valves 3008, the gas flow is directed to the correct vessels 3002(1)-(6). For example, as shown in FIGS. 30A-30B, vessel 3002(1) and vessel 3002(6) are isolated, whereas vessel 3002(2) and vessel 3002(3) are connected to each other. Similarly, vessel 3002(4) and vessel 3002(5) are connected to each other.

Figure 19A:
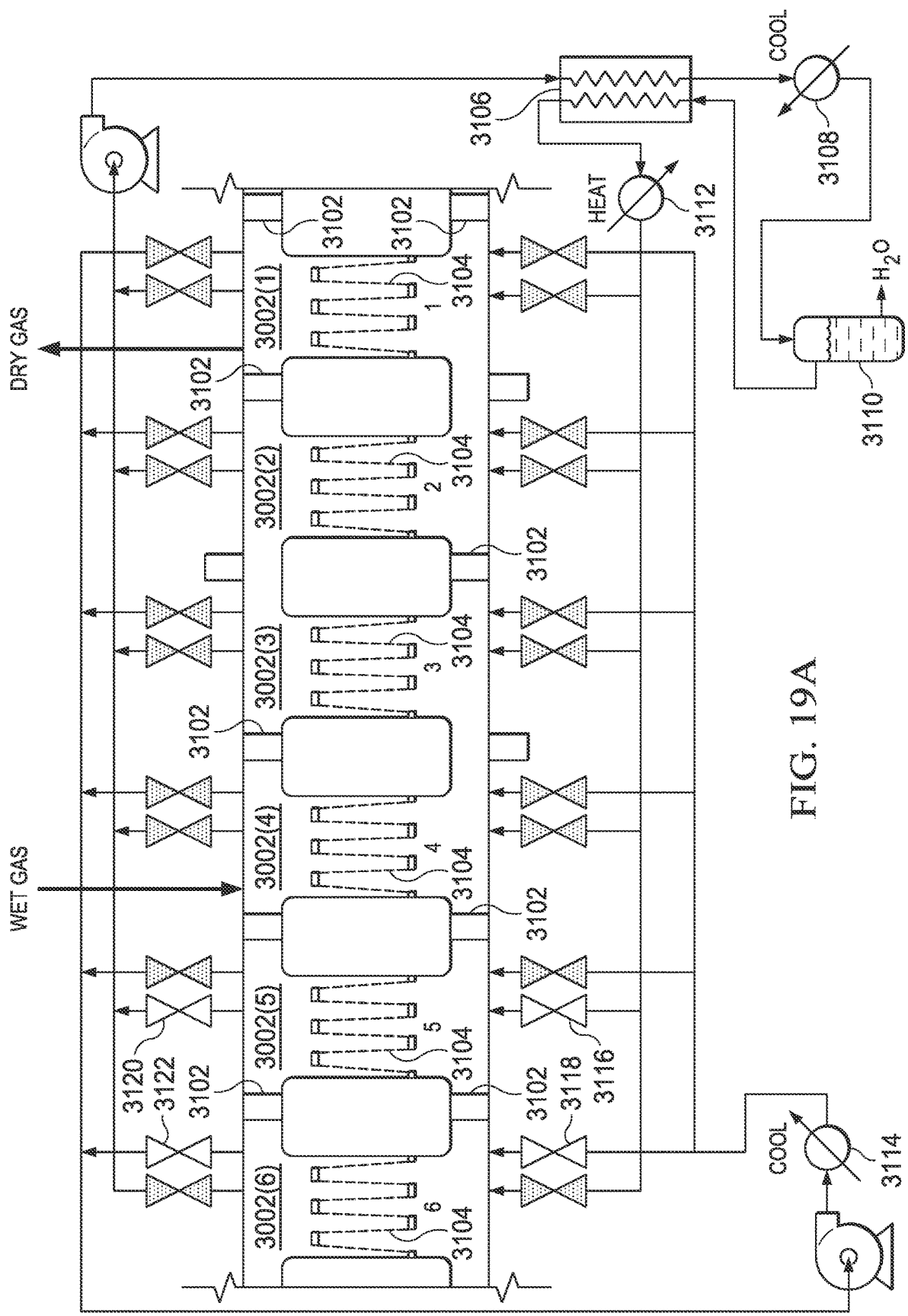
FIGS. 19A to 19F are schematic diagrams illustrating a system of interconnection adsorbent vessels coupled to independent cooling and heating systems according to aspects of the disclosure.
Figure 19B:
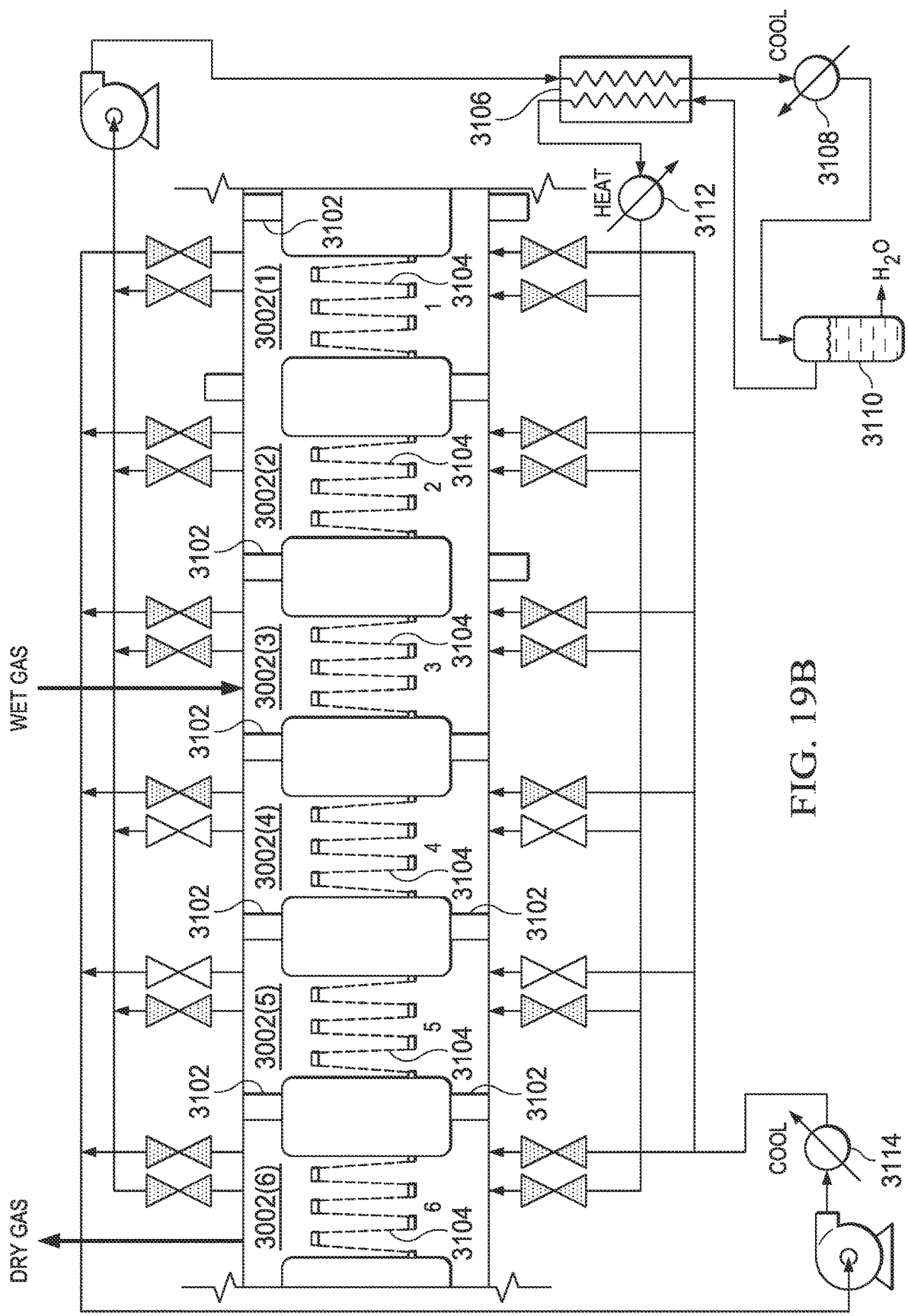
Figure 19C:
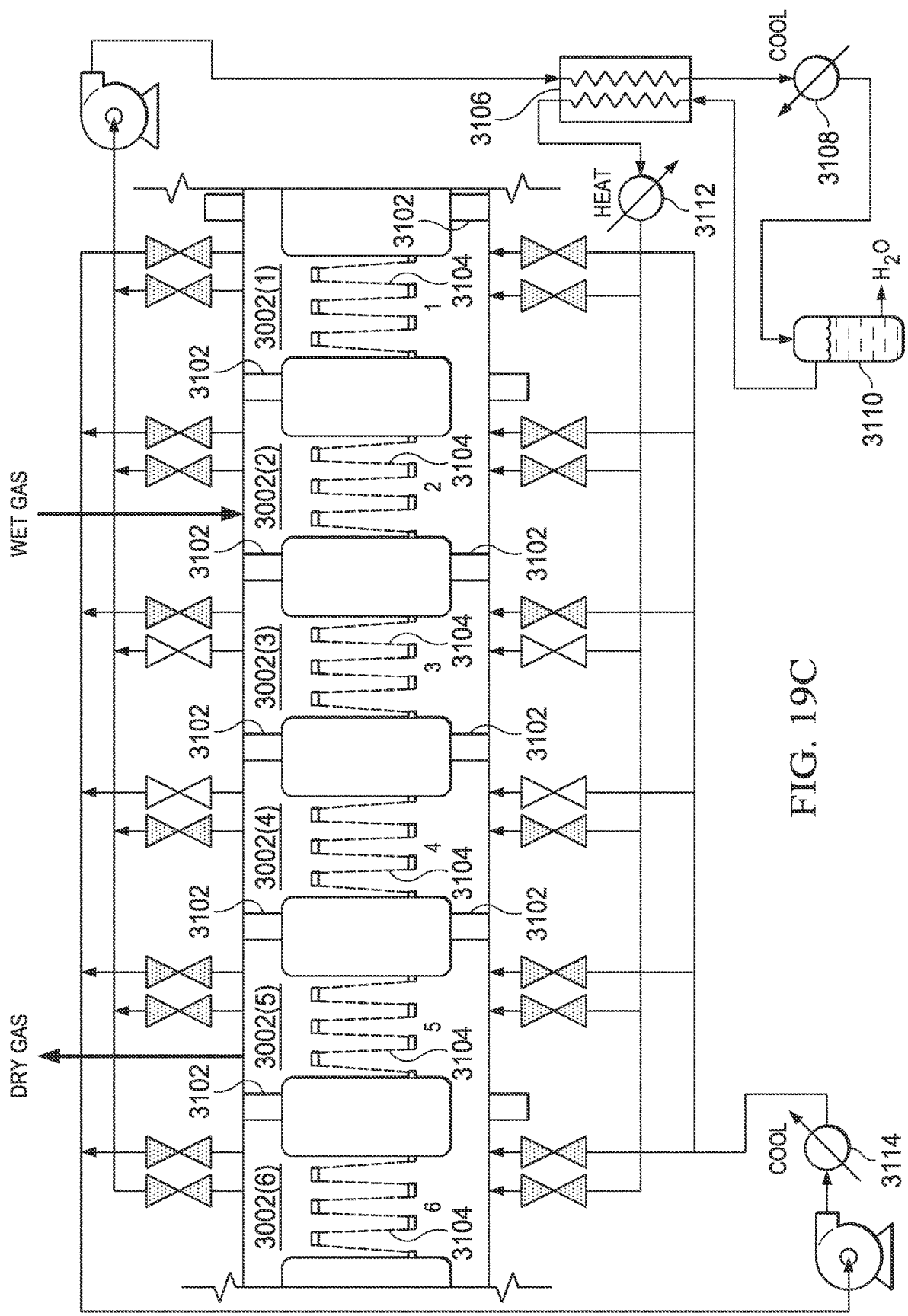
Figure 19D:
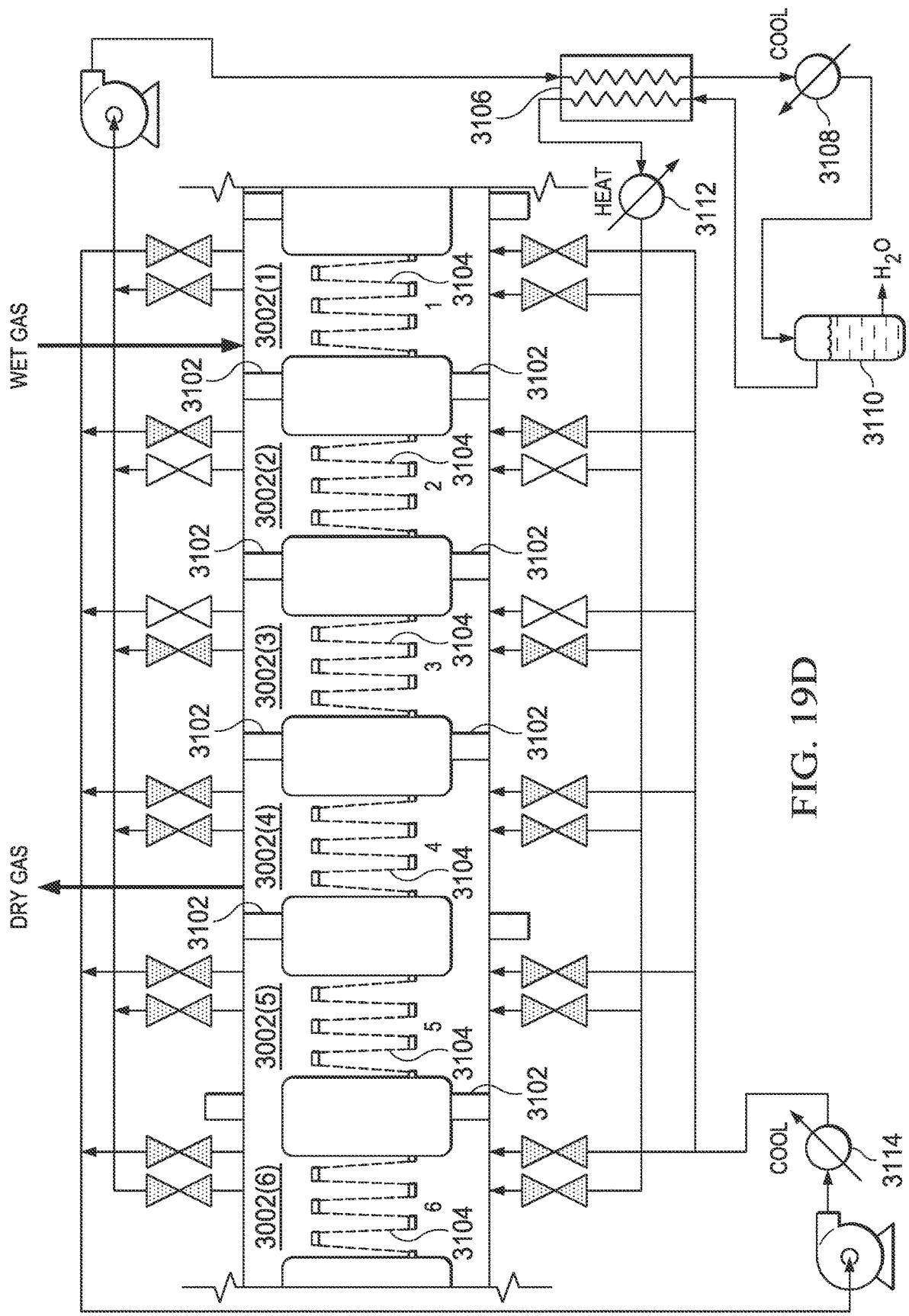
Figure 19E:
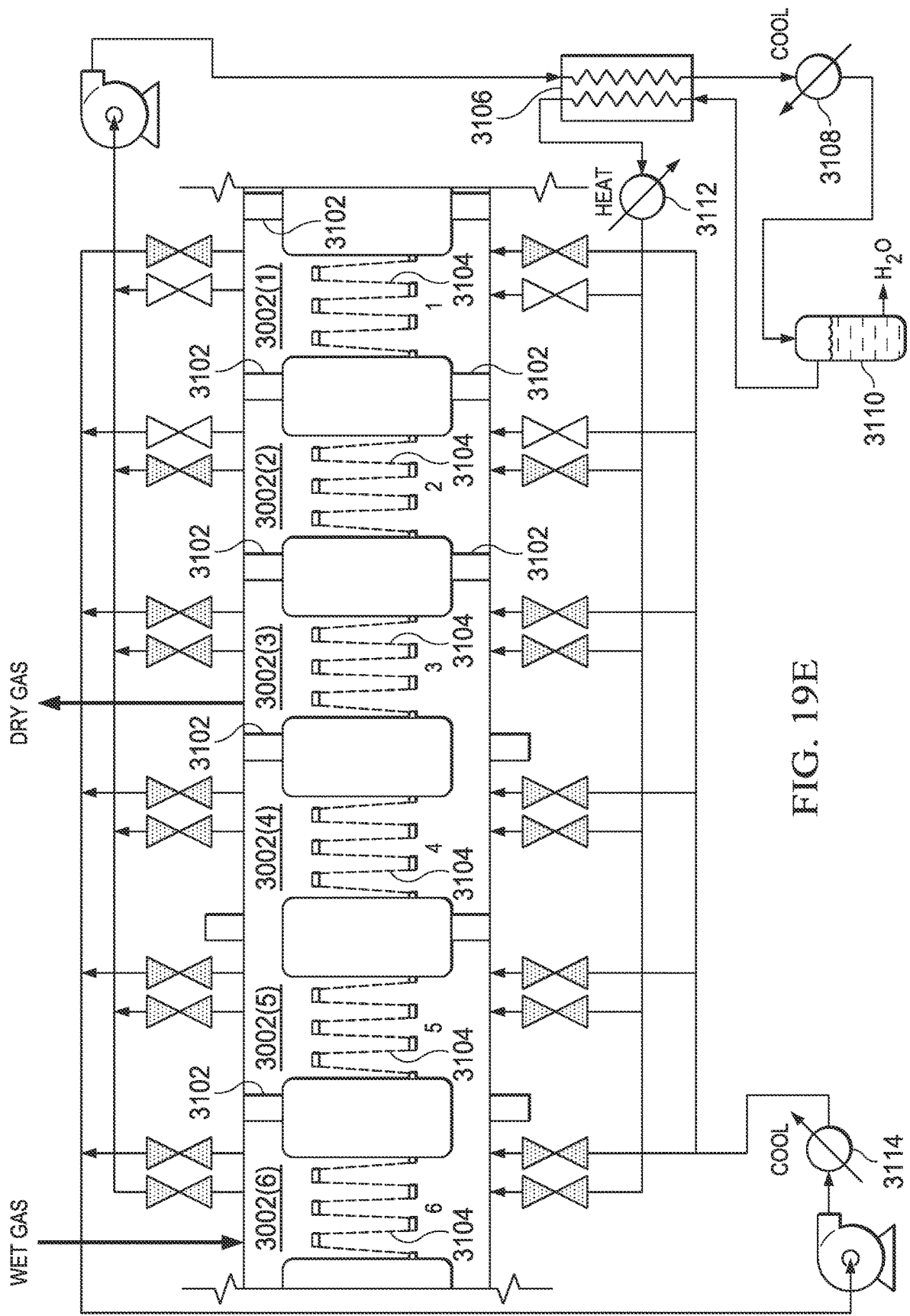
Figure 19F:
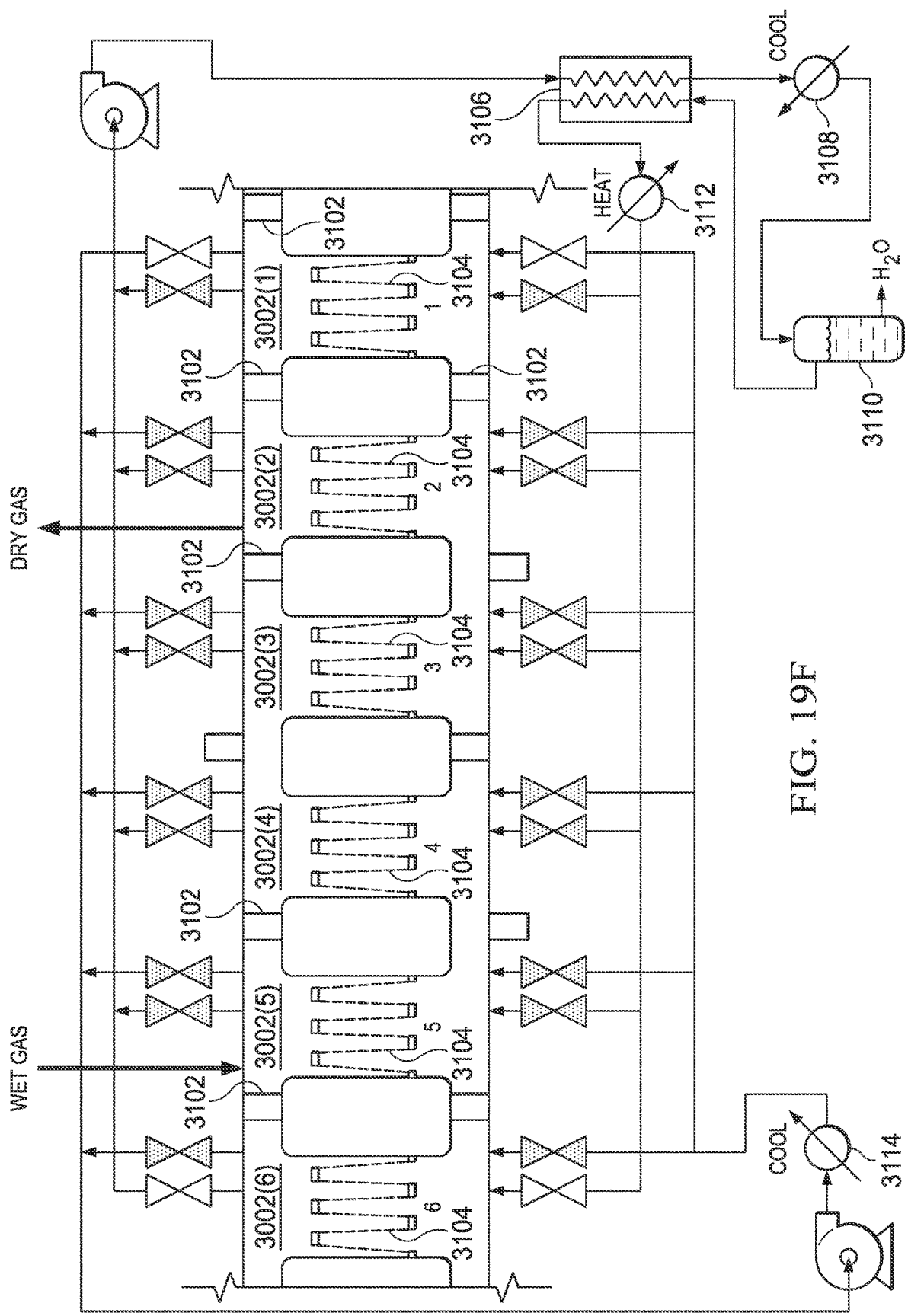

FIGS. 19A to 19F show six adsorbent vessels 3002 in operation; however, in various embodiments, more or fewer adsorbent vessels 3002 could be employed. Physically, the adsorbent vessels 3002 are arranged in a circular series as shown in FIGS. 18A-18B. For brevity and ease of understanding, the vessels 3002 are illustrated in a linear configuration in FIGS. 19A-19F. Each vessel has blocking valves 3102 that direct gas flow. As shown in FIG. 19A, vessels 3002(1)-(4) allow the wet flue gas to flow through conical beds 3104. The blocking valves 3102 prevent the flue gas from flowing through the vessels 3002(5)-(6). Vessel 3002 (5) is regenerated by circulating hot dry gas through the conical bed 3104. In various embodiments, the hot dry gas enters the vessel 3002(5) via a valve 3116 and leaves the vessel 3002(5) via a valve 3120. For purposes of illustration, in FIGS. 19A-19F valves 3116, 3120 shown in outline are open. Valves 3116, 3120 shown solid are closed. The circulating hot gas is dried by cooling it in a countercurrent sensible heat exchanger 3106, condensing moisture in a latent heat exchanger 3108 that rejects heat to a coolant, and knocking out the condensed water. The gas from the top of the knock-out vessel 3110 is preheated in the countercurrent sensible heat exchanger 3106 and is further heated in a heat exchanger 3112. Vessel 3002(6) is cooled by circulating cool gas that flows through a heat exchanger 3114 that rejects heat to a coolant. The cool gas enters the vessel 3002(6) via a valve 3118 and exits the vessel via a valve 3122. For purposes of illustration, in FIGS. 19A-19F valves 3118, 3122 shown in outline are open. Valves 3118, 3122 shown solid are closed. FIG. 19B illustrates circulation of flue gas through vessels 3002(3), 3002(2), 3002(1), and 3002(6). In FIG. 19B, vessel 3002(4) is heated and vessel 3002(5) is cooled. FIG. 19C illustrates circulation of flue gas through vessels 3002(2), 3002(1), 3002(6), and 3002(5). In FIG. 19C, vessel 3002(3) is heated and vessel 3002(4) is cooled. FIG. 19D illustrates circulation of flue gas through vessels 3002(1), 3002(6), 3002(5), and 3002(4). In FIG. 19D, vessel 3002(2) is heated and vessel 3002(3) is cooled. FIG. 19E illustrates circulation of flue gas through vessels 3002(6), 3002(5), 3002(4), and 3002(3). In FIG. 19E, vessel 3002(1) is heated and vessel 3002(2) is cooled.

Table 9 shows the function of each vessel during 10-min phases of a 1-h cycle. FIGS. 19A-19F show the valve sequences needed during each phase of the 1-h cycle. The wet gas is shown entering the appropriate vessel and dry gas is shown exiting the appropriate vessel. The inlet and outlet flows would be achieved through appropriate valves and piping (not shown for simplicity). When an even number of vessels are employed, the inlet and outlet flow occurs at the same end of the vessels. When an odd number of vessels are employed, the inlet and outlet flows occur at opposite ends of the vessels.

TABLE 9

Operating sequence for six desiccant vessels

| Time (min) | | Vessel | | | | | |
|---|---|---|---|---|---|---|---|
| Start | End | 1 | 2 | 3 | 4 | 5 | 6 |
| 0 | 10 | Dry 4 | Dry 3 | Dry 2 | Dry 1 | Heating | Cooling |
| 10 | 20 | Dry 3 | Dry 2 | Dry 1 | Heating | Cooling | Dry 4 |
| 20 | 30 | Dry 2 | Dry 1 | Heating | Cooling | Dry 4 | Dry 3 |
| 30 | 40 | Dry 1 | Heating | Cooling | Dry 4 | Dry 3 | Dry 2 |
| 40 | 50 | Heating | Cooling | Dry 4 | Dry 3 | Dry 2 | Dry 1 |
| 50 | 60 | Cooling | Dry 4 | Dry 3 | Dry 2 | Dry 1 | Heating |

Figure 20A:
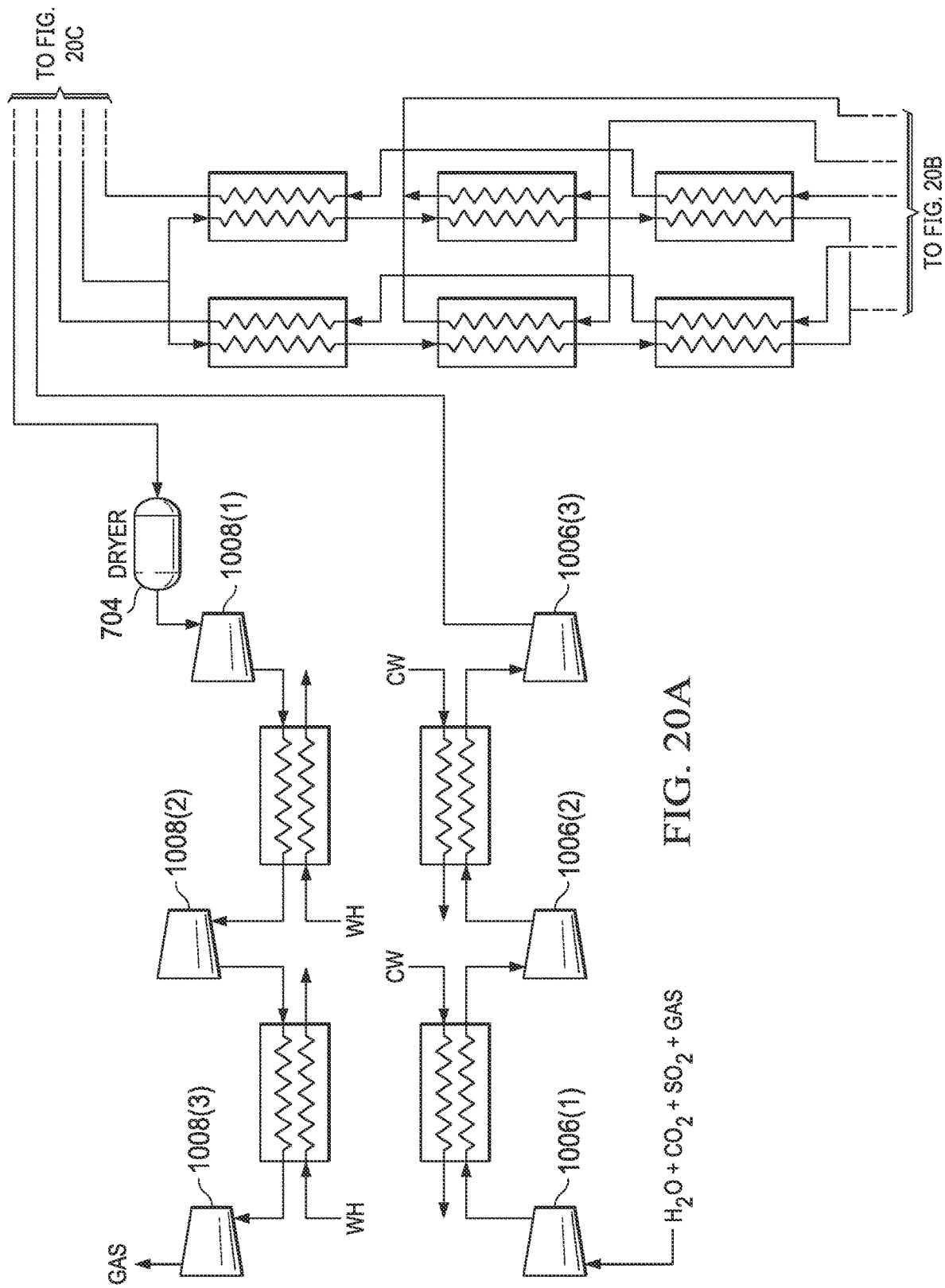
FIG. 20A-20C are a schematic diagram of a system for removal of carbon dioxide and sulfur oxides wherein the dryer integrates with components in the process according to aspects of the disclosure.
Figure 20C:
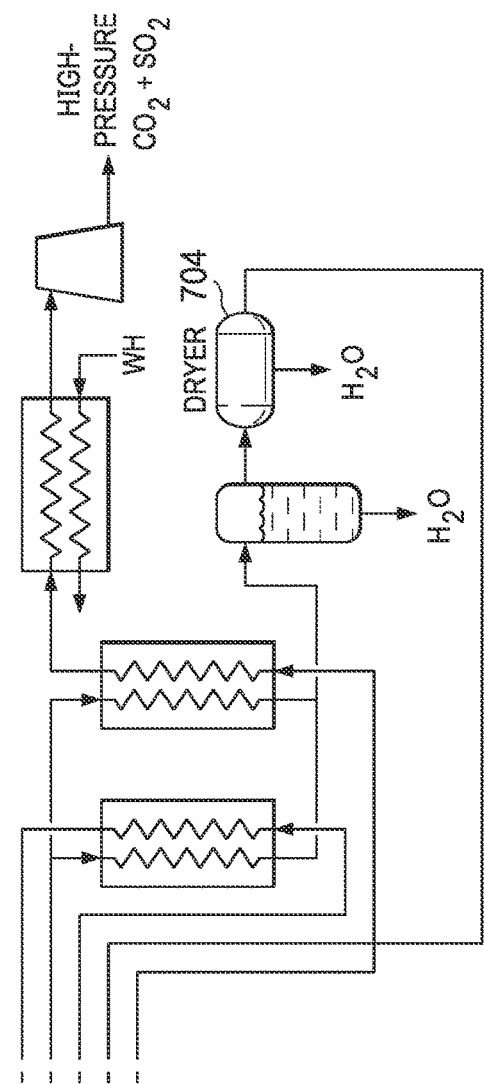
Figure 20B:
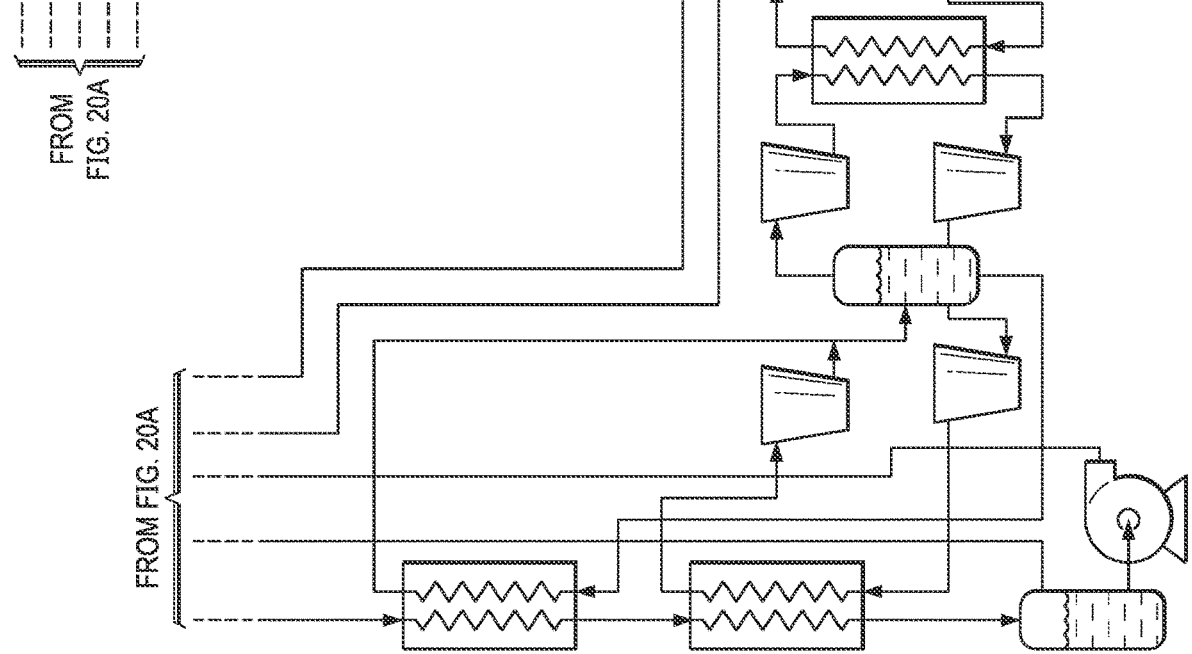
Figure 21:
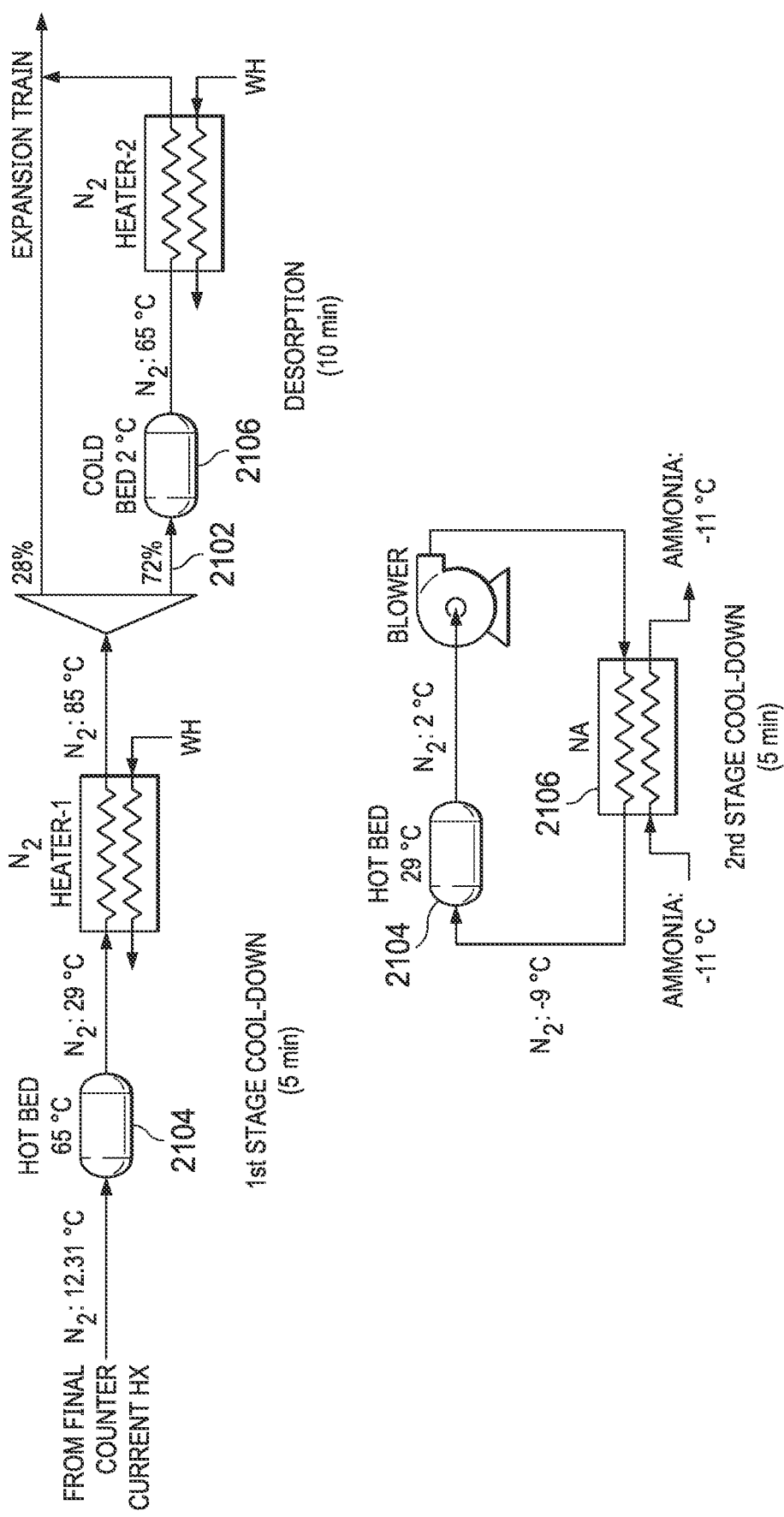
FIG. 21 is a schematic diagram of various adsorbent vessels integrated with components in the process according to aspects of the disclosure.

FIGS. 20A-20C show an overview of the process where flow streams are integrated into the dryer, which saves energy and capital. During the adsorption phase, wet flue gas at 2° C. flows through the adsorbent. This temperature is achieved by diverting the gas at the appropriate location in the countercurrent heat exchanger. FIG. 21 provides more detail on how the drying system integrates with the remaining process. During the desorption phase, a portion of hot dry gas 2102 is diverted from the stream that enters the expansion train. Under the conditions used in this example, 72% of the gas flows through the adsorbent bed 2106 and 28% bypasses and goes directly to the expansion train. The cool down phase has two stages. In the $1^{st}$ stage, cold gas (e.g., 12.31° C.) from the appropriate process stream flows through the hot bed 2104 to remove heat and cool the bed (e.g., 29° C.). In the $2^{nd}$ stage 2104, circulating gas (primarily $N_2$) is chilled (e.g., −9° C.), which cools the bed to 2° C. FIG. 20 shows how the drier integrates with the embodiment illustrated in FIGS. 9A-9C. To those individuals who are skilled in the art, it is readily apparent how this same approach will integrate with simpler versions of the process illustrated in FIGS. 3-8B.

Figure 22:
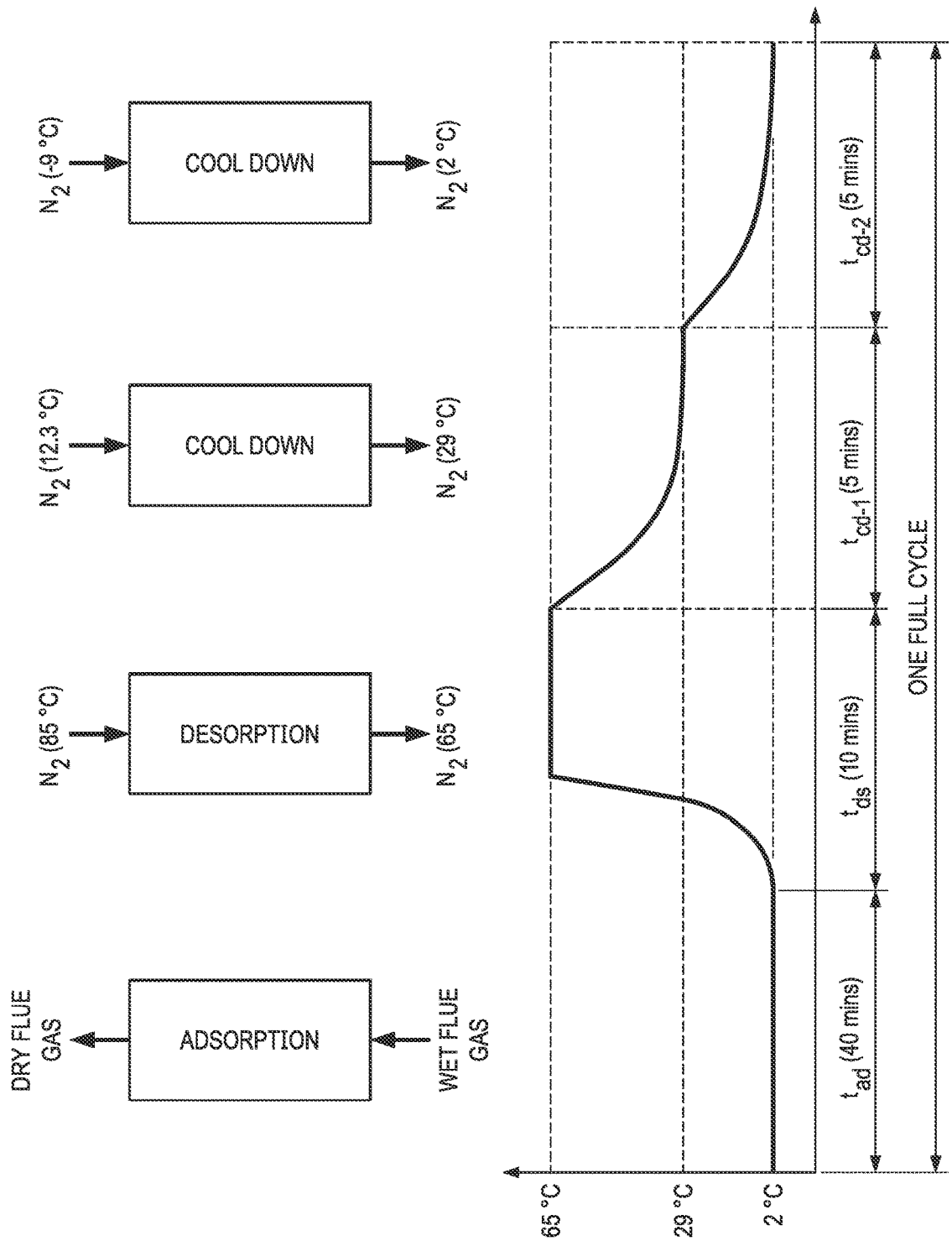
FIG. 22 is a plot of temperature profiles in various adsorbent vessels as a function of time.

FIG. 22 shows example temperature profiles during each phase of the cycle: (1) adsorption; (2) desorption; and (3) cool down. As previously described, the cool down phase has two stages; one uses readily available process streams and the other requires refrigerant.

Table 10 shows example parameters used in the dryer 704.

TABLE 10

| Typical parameters used in dryer |
| --- |
| Feed water partial pressure = 705 Pa |
| Feed water flow rate = 6 mol/s |
| Adsorption temperature = 2° C. |
| q* = water loading at 2° C. = 0.4 kg/kg |
| Desorption temperature = 65° C. |
| q* = water loading at 65° C. = 0.05 kg/kg |
| Vessel diameter = 1 m |
| Vessel length = 3 m |
| Number of vessels = 6 |
| Bed depth = 1 cm |
| Particle diameter = 3 mm |
| Bed fraction = 0.5 m³ bed/m³ vessel |
| Superficial velocity through bed = 1.3 m/s |
| Per-stage pressure drop = 0.03 bar |
| Minimum per-stage silica gel = 1814 kg |
| Actual total silica gel = 10,884 kg |

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A method of using a system to remove pollutants from flue gas, the method comprising:
providing the flue gas to the system, the system comprising:
a flue gas feed for receiving the flue gas;
a first heat exchanger coupled to the flue gas feed, the first heat exchanger thermally removing heat from the flue gas to form a cooled flue gas;
a dryer coupled to the cooled flue gas, the dryer forming a dehydrated flue gas;
a second heat exchanger coupled to the dehydrated flue gas, the second heat exchanger thermally exposing the dehydrated flue gas to a chilled refrigerant to form a liquid;
a pump coupled to the second heat exchanger, the pump increases a pressure of the liquid; and
a third heat exchanger that thermally exposes the pressurized liquid to the dehydrated flue gas, the third heat exchanger forming pressurized waste gases;
cooling, via the first heat exchanger, the flue gas to remove condensed water;
compressing, via the pump, the flue gas;
dehydrating, via the dryer, the flue gas; and
chilling, via the second heat exchanger, the dehydrated flue gas to condense and separate pollutants.

2. The method of claim 1, comprising pumping the condensed pollutants to a sequestration pressure.

3. The method of claim 1, comprising expanding noncondensible gases.

4. The method of claim 1, wherein the pollutants comprise carbon dioxide and sulfur dioxide.

5. The method of claim 1, wherein the dehydrating comprises use of an adsorbent.

6. The method of claim 1, wherein the dehydrating comprises use of lithium bromide.

7. The method of claim 5, comprising regenerating the adsorbent.

8. The method of claim 1, wherein the chilling comprises utilizing a multi-stage cascade of refrigerants.

9. A system for removing pollutants from a flue gas stream, the system comprising:
a flue gas feed;
a first heat exchanger coupled to the flue gas feed, the first heat exchanger thermally removing heat from the flue gas to form a cooled flue gas;
a dryer coupled to the cooled flue gas, the dryer forming a dehydrated flue gas;
a second heat exchanger coupled to the dehydrated flue gas, the second heat exchanger thermally exposing the dehydrated flue gas to a chilled refrigerant to form a liquid;
a pump coupled to the second heat exchanger, the pump increases a pressure of the liquid; and
a third heat exchanger that thermally exposes the pressurized liquid to the dehydrated flue gas, the third heat exchanger forming pressurized waste gases.

10. The system of claim 9, wherein the chilled refrigerant is cycled through a multi-stage refrigeration system.

11. The system of claim 10, wherein the multi-stage refrigeration system comprises a second refrigerant.

12. The system of claim 9, comprising a fourth heat exchanger coupled to the second heat exchanger, the fourth heat exchanger thermally exposing remaining gas to the dehydrated flue gas.

13. The system of claim 9, comprising a fifth heat exchanger coupled to the third heat exchanger, the fifth heat exchanger thermally exposing the waste gases to waste heat from an industrial process.

14. The system of claim 9, wherein the first heat exchanger exchanges heat from the flue gas with cold water.

15. The system of claim 9, comprising a compressor coupled to the flue gas feed upstream of the first heat exchanger.

16. The system of claim 9, wherein the dryer comprises a plurality of vessels containing an adsorbent.

17. The system of claim 16, wherein the adsorbent is silica gel.

18. The system of claim 16, wherein the flue gas is circulated through a first subset of the plurality of vessels while a second subset of the plurality of vessels is regenerated.

19. The system of claim 16, wherein the vessels contain adsorbent beds.

20. The system of claim 19, wherein the adsorbent beds are at least one of conical and cylindrical.

* * * * *